(12) United States Patent
Sato et al.

(10) Patent No.: US 10,550,211 B2
(45) Date of Patent: Feb. 4, 2020

(54) PROCESS FOR PRODUCING ETHYLENE/UNSATURATED CARBOXYLIC ACID COPOLYMER, AND SAID COPOLYMER

(71) Applicants: JAPAN POLYETHYLENE CORPORATION, Tokyo (JP); JAPAN POLYPROPYLENE CORPORATION, Tokyo (JP)

(72) Inventors: Naomasa Sato, Kanagawa (JP); Fumihiko Shimizu, Kanagawa (JP); Akio Tanna, Kanagawa (JP); Toshiaki Egashira, Kanagawa (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 38 days.

(21) Appl. No.: 15/868,276

(22) Filed: Jan. 11, 2018

(65) Prior Publication Data
US 2018/0201704 A1 Jul. 19, 2018

Related U.S. Application Data

(62) Division of application No. 15/113,243, filed as application No. PCT/JP2015/052064 on Jan. 26, 2015, now abandoned.

(30) Foreign Application Priority Data

Jan. 28, 2014 (JP) ................................. 2014-013705

(51) Int. Cl.
| C08F 210/02 | (2006.01) |
| C08F 8/12 | (2006.01) |
| C08F 220/06 | (2006.01) |
| C08F 4/80 | (2006.01) |

(52) U.S. Cl.
CPC .............. *C08F 210/02* (2013.01); *C08F 8/12* (2013.01); *C08F 2500/12* (2013.01); *C08F 2800/10* (2013.01); *C08F 2810/50* (2013.01)

(58) Field of Classification Search
CPC ...... C08F 210/02; C08F 8/12; C08F 2800/10; C08F 2810/50; C08F 2500/12
USPC ..................................................... 526/318.6
See application file for complete search history.

(56) References Cited

U.S. PATENT DOCUMENTS

| 3,132,120 A * | 5/1964 | Graham | ................ C08F 10/00 526/324 |
| 4,081,587 A | 3/1978 | Clampitt et al. | |
| 6,562,906 B2 | 5/2003 | Chen | |
| 8,669,312 B2 | 3/2014 | Iizuka et al. | |
| 2003/0181595 A1* | 9/2003 | Chen | ................ C08L 23/025 525/194 |
| 2011/0082244 A1* | 4/2011 | Iizuka | ................ C08L 23/0869 524/322 |
| 2011/0152010 A1 | 6/2011 | Kim et al. | |
| 2011/0257351 A1* | 10/2011 | Kobayashi | ........... C07F 9/5022 526/145 |
| 2012/0029130 A1* | 2/2012 | Iizuka | ................ A63B 37/0003 524/322 |

FOREIGN PATENT DOCUMENTS

| GB | 1179200 | 1/1970 |
| JP | S46-021643 | 6/1971 |
| JP | S60-079008 A | 5/1985 |
| JP | S63-075014 | 4/1988 |
| JP | H02-308803 | 12/1990 |
| JP | H06-060220 | 8/1994 |
| JP | 2010-150246 | 7/2010 |
| JP | 2013-227521 | 11/2013 |

OTHER PUBLICATIONS

V. Kryuchkov et al. "Amphiphilic Polyethylenes Leading to Surfactant-Free Thermoresponsive Nanoparticles", J. Am. Chem. Soc. 2010, 132, pp. 15573-15579. (Year: 2010).*

Kryuchkov et al. "Amphiphilic Polyethylenes Leading to Surfactant-Free Thermoresponsive Nanoparticles", Journal of the American Chemical Society, 2010, 132, No. 44, pp. 15573-15579 (Year: 2010).*

Notification of Reasons for Refusal issued with respect to Application No. 2015-012665, dated Jul. 24, 2018, and English translation.

European Office Action issued with respect to Application No. 15742823.6, dated Jul. 9, 2018.

Mark et al., "Encyclopedia of Polymer Science and Engineering, 2nd edition", 1986, pp. 708, vol. 13.

Ruenzi et al., "Direct Synthesis of Ethylene-Acrylic Acid Copolymers by Insertion Polymerization", J. Am. Chem. Soc., pp. 17690-17691, vol. 132, 2010.

Skupov et al., "Linear Polyethylene with Tunable Surface Properties by Catalytic Copolymerization of Ethylene with N-Vinyl-2-pyrrolidinone and N-Isopropylacrylamide", Macromolecules, pp. 2309-2310, vol. 41, 2008.

Kryuchkov et al., "Amphiphilic Polyethylenes Leading to Surfactant-Free Thermoresponsive Nanoparticles", J. Am. Chem. Soc., pp. 15573-15579, vol. 132, 2010.

(Continued)

*Primary Examiner* — Michael Bernshteyn
(74) *Attorney, Agent, or Firm* — Greenblum & Bernstein, P.L.C.

(57) ABSTRACT

Provided is a process of effectively producing an ethylene/unsaturated carboxylic acid copolymer having excellent mechanical and thermal properties. A process for producing an ethylene/unsaturated carboxylic acid copolymer comprises: producing an ethylene/unsaturated carboxylic acid ester copolymer from ethylene and unsaturated carboxylic acid ester using a late-transition-metal complex catalyst; and heating the ethylene/unsaturated carboxylic acid ester copolymer at a temperature capable of converting the ester group into a carboxylic acid group, thereby converting into the ethylene/unsaturated carboxylic acid copolymer.

4 Claims, 1 Drawing Sheet

(56) References Cited

OTHER PUBLICATIONS

International Search Report issued with respect to Application No. PCT/JP2015/052064, dated Mar. 24, 2015 with English translation.
International Preliminary Report on Patentability issued with respect to Application No. PCT/JP2015/052064, dated Aug. 2, 2016 with English translation.
European Search Report issued with respect to Application No. 15742823.6, dated Jan. 5, 2017.
Vladimir A. Kryuchkov et al., "Amphiphilic Polyethylenes Leading to Surfactant-Free Thermoresponsive Nanoparticles", J. Am. Chem. Soc., 2010, vol. 132, No. 44, pp. 15573-15579.
Kirill M. Skupov et al., "Palladium Aryl Sulfonate Phosphine Catalysts for the Copolymerization of Acrylates with Ethene", Macromolecular Rapid Communications, 2007, 28, pp. 2033-2038.
Jean-Christophe Daigle et al., "Prepration of Functional Polyethylenes by Catalytic Copolymerization", Macromolecules, 2011, 44, pp. 1760-1762.
The State Intellectual Property Office of P.R. China Office Action issued with respect to Application No. 201580006358.8 dated Jun. 16, 2017.
Chinese Notification of the Third Office Action issued with respect to Chinese Application No. 201580006358.8, dated Sep. 7, 2018, and English translation.
Notification of Reasons for Refusal, dated Mar. 15, 2019, in the corresponding Japanese patent application, Application No. 2015-012665, and English translation.
Decision of Rejection, dated Mar. 21, 2019, in the corresponding Chinese patent application, Application No. 201580006358.8, and English translation.

* cited by examiner

PROCESS FOR PRODUCING ETHYLENE/UNSATURATED CARBOXYLIC ACID COPOLYMER, AND SAID COPOLYMER

CROSS-REFERENCE TO RELATED APPLICATIONS

The present application is a divisional application of pending U.S. application Ser. No. 15/113,243 filed Jul. 21, 2016, which is a National Stage of International Patent Application No. PCT/JP2015/052064 filed on Jan. 26, 2015, which claims priority to Japanese Application No. 2014-013705 filed on Jan. 28, 2014. The disclosures of Japanese Application No. 2014-013705, U.S. application Ser. No. 15/113,243 and International Patent Application No. PCT/JP2015/052064 are incorporated by reference herein in their entireties.

TECHNICAL FIELD

The present invention relates to a novel process for producing a novel ethylene/unsaturated carboxylic acid copolymer and to the copolymer.

BACKGROUND ART

Processes for copolymerizing ethylene with a vinyl monomer containing a polar group by high-temperature high-pressure free-radical polymerization are well known. Examples of the vinyl monomer containing a polar group include unsaturated carboxylic acids or unsaturated carboxylic acid esters, such as vinyl acetate, (meth)acrylic acid, and (meth)acrylic esters. However, such processes for production by free-radical polymerization require an exceedingly large amount of energy because of the high temperature and the high pressure. In addition, the copolymers produced have low crystallinity due to the branches formed therein in a large number and hence have a drawback in that these copolymers are poor in mechanical and thermal properties (for example, non-patent document 1).

Meanwhile, a polymerization process for polyethylene production using a catalyst such as a metallocene catalyst is known to yield a polyethylene having a linear molecular structure. However, it has been thought that in cases when vinyl monomers containing a polar group are used as comonomers together with a common metallocene catalyst or the like, then these comonomers serve as a catalyst poison to considerably reduce the polymerization activity, making it impossible to obtain a desired copolymer.

It has been reported that copolymerization of ethylene with an acrylic ester, which is a vinyl monomer containing a polar group, using a chromium catalyst yields a linear copolymer having few branches (patent document 1). Consequently, hydrolyzing the ethylene/acrylic ester copolymer gives an ethylene/acrylic acid copolymer which also is linear and has few branches. However, the process for ethylene/acrylic ester copolymer production using a chromium catalyst requires, in a production step therein, aluminum chloride in an amount not less than equivalent to the acrylic ester and necessitates, after completion of the copolymerization, a step for removing substances derived from the aluminum compound. The process hence is industrially inefficient.

It was discovered that in cases when the novel catalyst based on a triarylphosphine or triarylarsine proposed by the present applicants in recent years is used, ethylene and a comonomer containing a polar group, such as an alkyl ester of acrylic acid, are copolymerized to obtain a linear ethylene copolymer without necessitating the use of an aluminum compound in excess (patent document 2). Furthermore, a linear ethylene copolymer obtained by copolymerizing ethylene with a norbornene-based acid anhydride comonomer or the like using the same catalyst and having excellent adhesiveness was proposed by the present applicants (patent document 3).

Moreover, copolymerization of ethylene and acrylic acid using a phosphinesulfonic acid/palladium catalyst was proposed recently as a process in which an aluminum compound is not used in excess likewise (for example, non-patent document 2). Furthermore, a polymer obtained by hydrolyzing a copolymer of ethylene and a t-butyl acrylic acid ester with trimethylsilyl iodide at a temperature of about 40° C. using a similar catalyst to thereby convert the copolymer into a copolymer of ethylene and acrylic acid has been reported (for example, non-patent document 3).

PRIOR-ART DOCUMENTS

Patent Documents

Patent Document 1: JP-A-63-75014
Patent Document 2: JP-A-2010-150246
Patent Document 3: JP-A-2013-227521
Patent Document 4: JP-B-06-060220

Non-Patent Documents

Non-Patent Document 1: Bamford, C. H. In Encyclopedia of Polymer Science and Engineering, 2nd ed.; Mark, H. F., Bikales, N. M., Overberger, C. G, Menges, G, Eds.; Wiley: New York, 1986; Vol. 13, p. 708.
Non-Patent Document 2: T. Ruenzi, D. Froehlich, S. Mecking, J. Am. Chem. Soc., 2010, 132, p. 17690-17691.
Non-Patent Document 3: V. A. Kryuchkov, J.-C. Daigle, K. M. Skupov, J. P. Claverie, F. M. Winnk, J. Am. Chem. Soc., 2010, 132, p. 15573-15579.
Non-Patent Document 4: Skupov, K. M.; Piche, L.; Claverie, J. P., Macromolecules, 2008, 41, p. 2309-2310.

SUMMARY OF THE INVENTION

Problems that the Invention is to Solve

However, in patent document 2, alkyl esters of acrylic acid are the only examples which are actually shown in the Synthesis Examples as comonomers used in the copolymerization of ethylene with an alkyl ester of acrylic acid. In patent document 3 also, the comonomers specifically used in the Examples are limited to ones having a stable structure, such as norbornene-based acid anhydrides, and there is no statement concerning specific activity in the case where an unsaturated carboxylic acid such as (meth)acrylic acid is used as a comonomer. Usually, a catalyst varies in catalytic activity depending on the kinds of the comonomers. It has been thought that in cases when the triarylphosphine- or triarylarsine-based catalyst disclosed in patent documents 2 and 3 is used to directly polymerize ethylene with an acrylic acid monomer, the catalyst shows low reaction activity and it is difficult to obtain an ethylene/unsaturated carboxylic acid copolymer which has a sufficiently high molecular weight and in which the monomers have been randomly and linearly copolymerized.

Meanwhile, the ethylene/acrylic acid copolymer produced using the phosphinesulfonic acid/palladium catalyst described in non-patent document 2 has a molecular weight, as determined by NMR analysis, of 10,000 or less and hence has insufficient mechanical strength. The copolymer described in non-patent document 3 has insufficient mechanical strength since this copolymer has a molecular weight of about 10,000. In addition, since the ester hydrolysis with trimethylsilyl iodide described in non-patent document 3 requires a time period as long as 24 hours, the process is thought to be inefficient from the standpoint of synthesis.

Incidentally, the copolymer of ethylene with acrylic acid or an acrylic ester described in patent document 1 is regarded therein as a random copolymer. However, from the relationship between comonomer content and melting point which will be described later (patent document 4 and non-patent document 4), this copolymer is thought not to be a homogeneous random copolymer. This copolymer is thought not to have sufficiently high mechanical properties.

An object of the invention is, in view of those problems of conventional techniques, to provide an efficient process for producing an ethylene/unsaturated carboxylic acid random copolymer, in particular, an ethylene/(meth)acrylic acid random copolymer, which is homogeneous and is excellent in terms of mechanical and thermal properties, and to provide the copolymer.

Means for Solving the Problems

The present inventors diligently made investigations and, as a result, have discovered a novel and efficient process in which an ethylene/acrylic acid copolymer can be produced by heating an ethylene/unsaturated carboxylic acid ester copolymer produced from ethylene and an unsaturated carboxylic acid ester by using a specific late-transition-metal complex catalyst. The inventors have further discovered that the ethylene/acrylic acid copolymer obtained by the production process is excellent in terms of mechanical and thermal properties. The invention has been thus completed.

Namely, according to the first invention of the present invention, a process for producing an ethylene/unsaturated carboxylic acid copolymer is provided, the process being a process for producing an ethylene/unsaturated carboxylic acid copolymer comprising a structural unit derived from ethylene and a structural unit derived from unsaturated carboxylic acid, which have been copolymerized randomly and linearly, wherein the process comprises: producing an ethylene/unsaturated carboxylic acid ester copolymer from ethylene and unsaturated carboxylic acid ester using a late-transition-metal complex catalyst; and heating the ethylene/unsaturated carboxylic acid ester copolymer at a temperature capable of converting the ester group into a carboxylic acid group, thereby converting into the ethylene/unsaturated carboxylic acid copolymer.

According to the second invention of the present invention, the process for producing an ethylene/unsaturated carboxylic acid copolymer according to the first invention is provided, wherein the unsaturated carboxylic acid ester is (meth)acrylic acid ester and the unsaturated carboxylic acid is (meth)acrylic acid.

According to the third invention of the present invention, the process for producing an ethylene/unsaturated carboxylic acid copolymer according to the first or second invention is provided, wherein a temperature of the heating is 150-350° C.

According to the fourth invention of the present invention, the process for producing an ethylene/unsaturated carboxylic acid copolymer according to any one of the first to the third inventions is provided, wherein the late-transition-metal complex catalyst is a catalyst comprising a late-transition-metal complex represented by the following formula (2):

(Ligand)MRL                                                                  (2)

[In formula (2), M represents a transition metal in Groups 9 to 11, "Ligand" represents a ligand which chelate-coordinates to the central-metal M through one or more atoms selected from the group consisting of oxygen, nitrogen, phosphorus, arsenic, sulfur, and carbon atoms. R represents a ligand which forms a σ-bond with the M, and L represents a ligand which coordinates to the M.]

According to the fifth invention of the present invention, the process for producing an ethylene/unsaturated carboxylic acid copolymer according to any one of the first to the fourth inventions is provided, wherein the late-transition-metal complex is a phosphine-phenolate complex or a phosphine-sulfonate complex.

According to the sixth invention of the present invention, the process for producing an ethylene/unsaturated carboxylic acid copolymer according to any one of the first to the fifth inventions is provided, wherein the unsaturated carboxylic acid ester is (meth)acrylic acid ester and the alcohol moiety of the (meth)acrylic acid ester is a tertiary alcohol.

According to the seventh invention of the present invention, an ethylene/unsaturated carboxylic acid copolymer is provided, which has been produced by the production process according to any one of the first to the sixth inventions.

According to the eighth invention of the present invention, an ethylene/(meth)acrylic acid copolymer is provided, which has been produced by the production process according to any one of the first to the sixth inventions.

According to the ninth invention of the present invention, an ethylene/(meth)acrylic acid copolymer is provided, which comprises 99.9-80.0 mol % of ethylene units and 0.1-20.0 mol % of (meth)acrylic acid units, and which has the following features (a) to (c):

(a) To have a weight-average molecular weight (Mw) as determined by GPC of 20,000 or higher but less than 1,000,000;

(b) To have a weight-average molecular weight/number-average molecular weight (Mw/Mn) as determined by GPC of 1.7-20; and (c) The melting point (Tm, ° C.) of the copolymer measured in an examination with a DSC (differential scanning calorimeter) and the content (AA, mol %) of (meth)acrylic acid units in the copolymer satisfy the following expression (I):

$$-3\ 0.74 \times AA + 113\ 0.5 < Tm < -3\ 0.74 \times AA + 130 \quad\quad\quad (I)$$

According to the tenth invention of the present invention, the ethylene/(meth)acrylic acid copolymer according to the ninth invention is provided, wherein the melting point (Tm) is 80-128° C.

Effects of the Invention

The production process of the invention is a process for producing a novel ethylene/unsaturated carboxylic acid copolymer. In this process, a homogeneous ethylene/unsaturated carboxylic acid ester random copolymer is produced by means of a late-transition-metal complex catalyst and is thereafter heated, thereby making it possible to produce a linear ethylene/unsaturated carboxylic acid random copolymer without using an aluminum compound in excess. According to the production process of the invention, an ethylene/unsaturated carboxylic acid copolymer can be efficiently produced in a short time period. The ethylene/unsaturated carboxylic acid copolymer, in particular, an ethylene/(meth)acrylic acid copolymer, of the invention is a homogeneous random copolymer, is relatively high in molecular weight and melting point, and is excellent in terms of mechanical and thermal properties. This copolymer hence is exceedingly useful.

MODES FOR CARRYING OUT THE INVENTION

Explanations are give below on an ethylene/(meth)acrylic acid copolymer which is an ethylene/unsaturated carboxylic acid copolymer obtained by a production process of an embodiment, and on the production process, etc.
1. Ethylene/(Meth)Acrylic Acid Copolymer
(1) Constituent Units The ethylene/(meth)acrylic acid copolymer according to this embodiment contains 99.9-80 mol % ethylene units and 0.1-20 mol % (meth)acrylic acid units based on the sum of the ethylene units and the (meth)acrylic acid units, which is taken as 100 mol %. Preferably, the copolymer contains 99.7-85 mol % ethylene units and 0.3-15 mol % (meth) acrylic acid units. More preferably, the copolymer contains 99.5-90 mol % ethylene units and 0.5-10 mol % (meth) acrylic acid units. The (meth)acrylic acid units contained in the copolymer may be acrylic acid units alone or methacrylic acid units alone or may be a combination of both.

In case where the content of ethylene units exceeds 99.9 mol %, it is difficult to obtain the effects of the copolymer with the polar monomer. Meanwhile, in case where the content thereof is less than 80 mol %, this copolymer is difficult to produce. In case where the content of (meth) acrylic acid units is less than 0.1 mol %, it is difficult to obtain the effects of the copolymer with the polar monomer. Meanwhile, in case where the content thereof exceeds 20 mol %, this copolymer is difficult to produce. The contents in mol % of the ethylene units and (meth)acrylic acid units which constitute the ethylene/(meth)acrylic acid copolymer can be controlled, for example, by increasing or reducing the amount ratio between the two monomers to be used as starting materials for producing the copolymer. The values of the contents of ethylene units and (meth)acrylic acid units are ones determined using IR analysis.

The ethylene/(meth)acrylic acid copolymer can contain constituent monomers, e.g., α-olefins, besides the constituent monomers shown above. For example, in the case of α-olefins, these monomers can be contained in an amount of 0.01-5 mol % based on the copolymer. Examples of the α-olefins include the same α-olefins as in the constituent monomers for the ethylene/unsaturated carboxylic acid ester copolymer which will be described later.

(2) Weight-Average Molecular Weight (Mw)

With respect to the molecular weight of the ethylene/(meth)acrylic acid copolymer according to the embodiment, the weight-average molecular weight (Mw) thereof, as determined by GPC, is 20,000 or higher but less than 1,000,000, preferably 25,000 or higher but less than 900,000, more preferably 30,000 or higher but less than 800,000, especially preferably 40,000 or higher but less than 700,000. In case where the weight-average molecular weight thereof is less than 20,000, this copolymer has reduced mechanical strength. In case where the weight-average molecular weight thereof exceeds 1,000,000, there is a possibility that this copolymer might have drawbacks concerning processability, etc.

(3) Weight-Average Molecular Weight/Number-Average Molecular Weight (Mw/Mn)

The ethylene/(meth)acrylic acid copolymer according to this embodiment has a molecular weight distribution [(weight-average molecular weight)/(number-average molecular weight): Mw/Mn] of desirably 1.7 or higher, preferably 1.7-20, more preferably 1.8-15, even more preferably 1.9-10. In case where the molecular weight distribution thereof is less than 1.7, there is a possibility that this copolymer might have drawbacks concerning moldability, etc. When the molecular weight distribution thereof exceeds 20, there are cases where the low-molecular-weight components cause a decrease in property, etc.

The Mw and Mn of the ethylene/(meth)acrylic acid copolymer can be controlled by regulating the Mw and Mn of the ethylene/(meth)acrylic ester copolymer which will be described later. The Mw and Mn of the ester copolymer can be controlled by a conventionally known method as will be described later, and can be controlled, for example, by regulating the polymerization temperature and the monomer concentrations. The values of Mw and Mw/Mn are ones determined by gel permeation chromatography (GPC), and the measurement conditions are as will be described in the Examples given later.

(4) Relationship Between Melting Point (Tm) and Content of (Meth)Acrylic Acid Units (AA)

Figure 1:
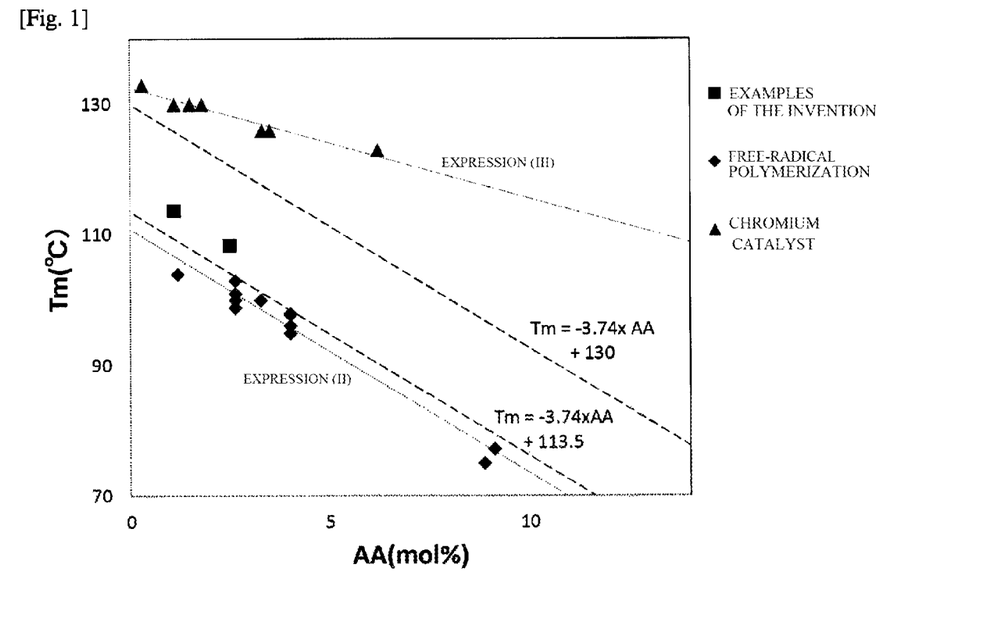
FIG. 1 is a chart which shows relationships between the melting points (Tm) of ethylene/(meth)acrylic acid copolymers and the contents of (meth)acrylic acid units (AA) in the copolymers in non-patent document 4 (free-radical polymerization), patent document 4 (chromium-containing catalyst), and Examples according to the invention.

FIG. 1 is a chart which shows relationships, in ethylene/(meth)acrylic acid copolymers produced by conventional production processes and in the ethylene/(meth)acrylic acid copolymer according to this embodiment, between the melting point (Tm, ° C.) thereof and the content of (meth)acrylic acid units (AA, mol %) therein. The relationships between melting point (Tm) and the content of (meth)acrylic acid units (AA) are explained below while referring to FIG. 1.

Ethylene/(meth)acrylic acid copolymers produced by the conventional high-temperature high-pressure free-radical polymerization process are random copolymers. It is known that the relationship between the melting point (Tm, ° C.) of such copolymers and the content of (meth)acrylic acid units (AA, mol %) therein substantially satisfies the following expression (II) as shown by the plot of solid rhombs in FIG. 1 (non-patent document 4).

$$Tm = -3.74 \times AA + 111 \qquad \text{expression (II)}$$

Meanwhile, in ethylene/(meth)acrylic acid copolymers produced with a conventional chromium catalyst, the relationship between the melting point (Tm, ° C.) of such copolymers and the content of (meth)acrylic acid units (AA, mol %) therein substantially satisfies the following expression (III) as shown by the plot of solid triangles in FIG. 1 (Examples of patent document 4).

$$Tm = -1.70 \times AA + 132.6 \qquad \text{expression (III)}$$

It is thought that the ethylene/(meth)acrylic acid copolymers produced with a chromium catalyst are not homogeneous random copolymers, and the slope (−1.70) of the straight line of expression (III) is smaller than the slope (−3.74) of expression (II) for the copolymers produced by the free-radical polymerization process. This is thought to be because these copolymers have a high block character regarding copolymerization and, even when the content of (meth)acrylic acid units therein has increased, show polymer property behaviors similar to those of polyethylene homopolymer because of the long ethylene chains. Consequently, there is a possibility that polymers produced with chromium catalysts might have poor transparency or have bright spots such as fish-eyes in an increased amount, resulting in problems concerning properties.

In contrast, the melting point (Tm, ° C.) of the ethylene/(meth)acrylic acid copolymer according to this embodiment and the content of (meth)acrylic acid units (AA, mol %) in the copolymer have a relationship represented by the following expression (I) as shown by the plot of solid squares in FIG. 1.

$$-3.74 \times AA + 113.0.5 < Tm < -3.74 \times AA + 130 \quad \text{expression (I)}$$

It is preferable that the Tm and the AA should have a relationship represented by the following expression (I').

$$-3.74 \times AA + 113.0.7 < Tm < -3.74 \times AA + 128 \quad \text{expression (I')}$$

It is more preferable that the Tm and the AA should have a relationship represented by the following expression (I").

$$-3.74 \times AA + 117.0.375 \leq Tm \leq -3.74 \times AA + 118.125 \quad \text{expression (I")}$$

The slope (−3.74) of the straight line in the left side and right side of each of expressions (I) to (I") is equal to the slope in expression (II) for the random copolymers produced by the free-radical polymerization process. This is thought to be because the ethylene/(meth)acrylic acid copolymer according to this embodiment is a random copolymer produced using a late-transition-metal catalyst and hence shows the same straight-line slope as the random copolymers produced by the conventional free-radical polymerization process. Reasons for the slope are not limited thereto.

As shown in FIG. 1, a comparison between the ethylene/(meth)acrylic acid copolymer according to this embodiment (plot of solid squares) and the copolymers produced by the conventional free-radical polymerization process (plot of solid rhombs) indicates that the two kinds of copolymers are substantially equal in the rate at which the melting point decreases as the content of acrylic acid increases. However, the ethylene/(meth)acrylic acid copolymer according to this embodiment shows a higher Tm and better heat resistance, when the two kinds of copolymers are equal in acrylic acid content.

It is known that the number of polyethylene chain branches generally is inversely proportional to the melting point and the melting point decreases as the number of branches increases, regardless of the branch groups (non-patent document 4). Namely, copolymers which contain a larger amount of (meth)acrylic acid units, methyl branches, etc. have lower melting points and poorer heat resistance. In the case of copolymers which are equal in the content of (meth)acrylic acid, the function due to polar groups is thought to be exhibited on the same level and it is thought that the smaller the number of methyl branches in such copolymers, the higher the melting point thereof and the higher the heat resistance thereof. Since the ethylene/(meth)acrylic acid copolymer according to this embodiment, which has been produced using a late-transition-metal complex catalyst, is a copolymer in which the monomers have been linearly copolymerized and the number of methyl branches is small, this copolymer is thought to have a higher melting point than the copolymers produced by the free-radical polymerization process. Mechanisms whereby a high melting point is brought about are not limited thereto.

Figure 2:
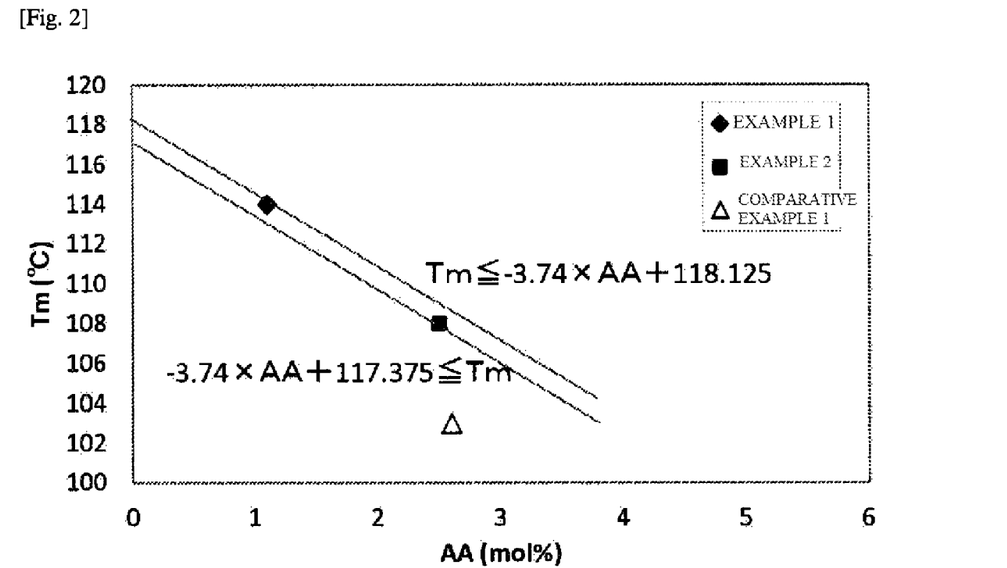
FIG. 2 is a chart which shows relationships between the melting points (Tm) of ethylene/(meth)acrylic acid copolymers and the contents of (meth)acrylic acid units (AA) in the copolymers in Examples according to the invention and a Comparative Example.

FIG. 2 is a chart which shows relationships between the melting point (Tm) of an ethylene/(meth)acrylic acid copolymer and the content of (meth)acrylic acid units (AA) in the copolymer in Examples according to the invention and Comparative Example. As shown in FIG. 2, the two intercepts (117.375 and 118.125) of the straight lines in expression (I") are values determined from the melting points (Tm) shown in Examples 1 and 2 according to the invention and from the contents of (meth)acrylic acid units (AA) in the copolymers, on the assumption that the slopes of these straight lines are the same value (−3.74) as in expression (I).

The Tm of the ethylene/(meth)acrylic acid copolymer according to this embodiment is not particularly limited so long as the Tm satisfies the relationship represented by expression (I). From the standpoint of heat resistance, however, the Tm is preferably 80-128° C., more preferably 90-122° C. The Tm can be controlled so as to be within that range by regulating the comonomer concentrations. Methods for regulating the comonomer concentrations will be explained in the section "Ethylene/(meth)acrylic Ester Polymerization Reaction". Incidentally, values of Tm are ones measured with a differential scanning calorimeter (DSC), and the measurement conditions are as described in the Examples which will be given later.

The ethylene/(meth)acrylic acid copolymer according to this embodiment has high randomness, and (meth)acrylic acid units have been disposed in the polymer so as to be isolated from each other. Consequently, the ethylene chains are short, and amorphous portions are present in an increased amount. As a result, the polymer structure is homogeneous, and improved transparency is attained.

2. Process for Producing Ethylene/Unsaturated Carboxylic Acid Copolymer

The ethylene/unsaturated carboxylic acid copolymer (hereinafter referred to also as "polymer of this embodiment") including the ethylene/(meth)acrylic acid copolymer can be produced by the novel production process of the invention.

Specifically, the process for producing the polymer of this embodiment can include (1) a step in which an ethylene/unsaturated carboxylic acid ester copolymer is produced from ethylene and unsaturated carboxylic acid ester using a late-transition-metal complex catalyst and (2) a step in which the ethylene/unsaturated carboxylic acid ester copolymer is heated at a temperature capable of converting the ester groups into carboxylic acid groups, thereby converting the ethylene/unsaturated carboxylic acid ester copolymer into the ethylene/unsaturated carboxylic acid copolymer.

Although the production process includes two steps, these steps may be consecutively performed or separately performed. Each step is explained below.

(1) Step for Producing Ethylene/Unsaturated Carboxylic Acid Ester Copolymer

The production process of this embodiment includes, as step (1), a step in which a late-transition-metal complex catalyst is used to produce an ethylene/unsaturated carboxylic acid ester copolymer form ethylene and at least one unsaturated carboxylic acid ester.

(I) Constituent Monomers for Ethylene/Unsaturated Carboxylic Acid Ester Copolymer The ethylene/unsaturated carboxylic acid ester copolymer obtained in step (1) includes ethylene and unsaturated carboxylic acid ester as constituent monomers.

Examples of the unsaturated carboxylic acid ester include unsaturated carboxylic acid esters such as acrylic esters, methacrylic esters, maleic esters, fumaric esters, and itaconic esters. Preferred of these are acrylic esters or methacrylic esters (hereinafter these esters are inclusively referred to also as "(meth)acrylic esters"). One unsaturated carboxylic acid ester may be used alone, or two or more unsaturated carboxylic acid esters may be used in combination.

Besides those constituent monomers, α-olefins and the like may be contained in an amount of 0.01-5 mol % based on the whole copolymer, so long as the inclusion thereof does not defeat the object of the invention. α-Olefins are α-olefins represented by the general formula $CH_2=CHR^A$, where $R^A$ is a hydrogen atom or a hydrocarbon group which has 1-20 carbon atoms and may have a branch, ring, and/or unsaturated bond. In case where the number of carbon atoms of $R^A$ is larger than 20, sufficient polymerization activity tends not to be exhibited. Consequently, preferred α-olefins, among those, include propylene, 1-butene, 1-pentene, 1-hexene, 1-octene, 1-decene, 3-methyl-1-butene, 4-methyl-1-pentene, vinylcyclohexene, and styrene. More preferred are propylene, 1-butene, 1-hexene, 1-octene, 3-methyl-1-butene, and styrene.

Examples of the unsaturated carboxylic acid ester as a constituent monomer include unsaturated carboxylic acid esters such as acrylic esters, methacrylic esters, maleic esters, fumaric esters, and itaconic esters. Especially preferred are acrylic esters or methacrylic esters.

The (meth)acrylic esters to be used as constituent monomers may be compounds represented by the following general formula (1).

$$CH_2=C(R^B)CO_2(R^C) \quad \text{formula (1)}$$

[In formula (1), $R^B$ represents a hydrogen atom or a hydrocarbon group having 1-10 carbon atoms, and may have a branch, ring, and/or unsaturated bond. $R^C$ represents a hydrocarbon group having 1-30 carbon atoms, and may have a branch, ring, and/or unsaturated bond. $R^C$ may contain a heteroatom at any desired position therein.]

In general formula (1), $R^B$ is a hydrogen atom or a hydrocarbon group having 1-10 carbon atoms. In case where the number of carbon atoms of $R^B$ is 11 or larger, sufficient polymerization activity tends not to be exhibited. It is preferable that $R^B$ should be a hydrogen atom or a hydrocarbon group having 1-5 carbon atoms. More preferred examples include methacrylic esters in which $R^B$ is a methyl group or acrylic esters in which $R^B$ is a hydrogen atom.

In general formula (1), $R^C$ is a hydrocarbon group having 1-30 carbon atoms. In case where the number of carbon atoms of $R^C$ exceeds 30, the polymerization activity tends to decrease. $R^C$ is preferably a hydrocarbon group having 1-13 carbon atoms, more preferably a hydrocarbon group having 1-10 carbon atoms. Although the structure of $R^C$ is not particularly limited, a branched structure is more preferred, and a tertiary structure is even more preferred.

Specific examples of the (meth)acrylic esters represented by general formula (1) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, 1,3-dimethylbutyl (meth)acrylate, cyclohexyl (meth)acrylate, 2-ethylpentyl (meth)acrylate, 1,1,2,2-tetramethylpropyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 4-t-butylcyclohexyl (meth)acrylate, 1-methylcyclopentyl (meth)acrylate, 1-methylcyclohexyl (meth)acrylate, 4-t-pentylcyclohexyl (meth)acrylate, 2-norbornyl (meth)acrylate, 1-adamantyl (meth)acrylate, 2-adamantyl (meth)acrylate, bicyclo[2,2,1]pentan-1-yl (meth)acrylate, decahydro-2-naphthalenyl (meth)acrylate, and octahydro-4,7-methano-1H-inden-5-yl (meth)acrylate.

Preferred examples among these include isopropyl (meth)acrylate, isobutyl (meth)acrylate, t-butyl (meth)acrylate, 1,3-dimethylbutyl (meth)acrylate, cyclohexyl (meth)acrylate, 2-ethylpentyl (meth)acrylate, 1,1,2,2-tetramethylpropyl (meth)acrylate, octyl (meth)acrylate, 2-ethylhexyl (meth)acrylate, 4-t-butylcyclohexyl (meth)acrylate, 1-methylcyclopentyl (meth)acrylate, 1-methylcyclohexyl (meth)acrylate, 4-t-pentylcyclohexyl (meth)acrylate, 2-norbornyl (meth)acrylate, 1-adamantyl (meth)acrylate, 2-adamantyl (meth)acrylate, bicyclo[2,2,1]pentan-1-yl (meth)acrylate, decahydro-2-naphthalenyl (meth)acrylate, and octahydro-4,7-methano-1H-inden-5-yl (meth)acrylate. One (meth)acrylic ester ingredient may be used alone, or a plurality of (meth)acrylic ester ingredients may be used in combination.

From the standpoint of the efficiency of the thermal decomposition which will be described later, especially preferred (meth)acrylic esters for use in the production process of this embodiment include (meth)acrylic esters in each of which the alcohol moiety is a tertiary alcohol. Especially preferred of these is t-butyl (meth)acrylate, from the standpoints of monomer availability, etc.

(II) Late-Transition-Metal Complex Catalyst

Processes for producing the ethylene/unsaturated carboxylic acid ester copolymer are not particularly limited, and conventionally known processes can be used. It is, however, preferred to produce the copolymer using the following late-transition-metal complex catalyst. Usable late-transition-metal complex catalysts are not particularly limited so long as a polymer which satisfies the specific structure of the polymer according to this embodiment is obtained. However, more preferred is a process in which the copolymer is produced using a late-transition-metal complex represented by the following general formula (2).

$$(\text{Ligand})\text{MRL} \quad (2)$$

[In formula (2), M represents a transition metal in Groups 9 to 11. "Ligand" is a ligand which chelate-coordinates to the central-metal M through one or more atoms selected from the group consisting of oxygen, nitrogen, phosphorus, arsenic, sulfur, and carbon atoms. R represents a ligand which forms a σ-bond with the M. L represents a ligand which has coordinated to the M.]

In general formula (2), M is a transition metal in Groups 9 to 11, preferably Group 10, and is more preferably nickel (Ni) or palladium (Pd). The valence of the atom M is 0, 1, or 2, preferably 0 or 2.

In general formula (2), "Ligand" is a ligand which chelate-coordinates to the central-metal M through one or more atoms selected from the group consisting of oxygen, nitrogen, phosphorus, arsenic, sulfur, and carbon atoms. This ligand "Ligand" preferably is a bidentate ligand.

Examples of the atom(s) through which the ligand coordinates to the M include nitrogen, oxygen, phosphorus, arsenic, sulfur, and carbon. Preferred are nitrogen, oxygen, phosphorus, and sulfur. More preferred are nitrogen, oxygen, and phosphorus.

Combinations of atoms through which the bidentate ligand coordinates to the M are not particularly limited, and a combination of any desired two elements of those atoms is possible. When, for example, a combination in which the ligand coordinates to the M through one nitrogen atom and through one oxygen atom is expressed by "nitrogen/oxygen", then preferred combinations of coordination atoms are nitrogen/nitrogen, nitrogen/oxygen, oxygen/phosphorus, phosphorus/phosphorus, and phosphorus/sulfur.

The mode of bonding of the ligand to the central metal atom (M) is not particularly limited, and examples thereof include coordination by a lone pair (hereinafter this coordination is often referred to as "σ-coordination"), π-coordination, and σ-bonding (bonding by atomic orbitals extending along the bonding axis direction). Preferred of these are σ-coordination and σ-bonding.

The mode of bonding of the bidentate ligand to the M is also not particularly limited, and examples thereof include any desired two bonding modes selected from among the modes of bonding shown above. When, for example, a combination in which the bidentate ligand coordinates to the M by one σ-coordination and one σ-bonding is expressed by "σ-coordination/σ-bonding", then preferred combinations are σ-coordination/σ-coordination and σ-coordination/σ-bonding.

Although combinations of atoms and combinations of coordination modes were shown above only briefly, there are multiple ways of combining these. Namely, in the case where the combination nitrogen/oxygen and the combination σ-coordination/σ-bonding have been selected, this selection means both nitrogen (σ-coordination)/oxygen (σ-bonding) and nitrogen (σ-bonding)/oxygen (σ-coordination).

In general formula (2), R is a ligand which forms a σ-bond with the M. Ligand R is not particularly limited so long as this ligand is capable of forming a σ-bond with the M. Examples thereof include a hydrogen atom, halogen atoms, hydrocarbon groups, halogenated hydrocarbon groups, silicon-containing hydrocarbon groups, oxygen-containing hydrocarbon groups, amino group, substituted amino groups, or nitrogen-containing hydrocarbon groups.

In general formula (2), L represents a ligand which has coordinated to the M, and L is a hydrocarbon compound that has 1-20 carbon atoms and that has an oxygen, nitrogen, or sulfur atom as an atom capable of forming a coordination bond. Also usable as the L is a hydrocarbon compound (which may have a heteroatom) which has a carbon-carbon unsaturated bond capable of coordinating to transition metals.

(i-1) Phosphine-Phenolate Complex (A)

More preferred of such late-transition-metal complexes represented by general formula (2) is a phosphine-phenolate complex (A) represented by the following general formula (A).

In the following explanations on general formulae, $R^8$ represents a hydrocarbon group having 1-20 carbon atoms and $R^9$ represents a hydrogen atom or a hydrocarbon group having 1-20 carbon atoms.

[Chem. 1]

(A)

[In formula (A), M represents nickel or palladium. $R^1$ represents a hydrogen atom or a hydrocarbon group which has 1-20 carbon atoms and may contain a heteroatom. $L^1$ represents a ligand which has coordinated to the M. $R^1$ and $L^1$ may be bonded to each other to form a ring. P represents phosphorus. O represents oxygen. $R^2$ and $R^3$ each independently represents a hydrocarbon group which has 1-30 carbon atoms and may contain a heteroatom, and $R^2$ and $R^3$ may be bonded to each other to form a ring. $R^4$ to $R^7$ each independently represent a hydrogen atom, a halogen atom, a hydrocarbon group which has 1-30 carbon atoms and may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2K$, or an epoxy-containing group (where $R^8$ represents a hydrocarbon group having 1-20 carbon atoms, $R^9$ represents a hydrogen atom or a hydrocarbon group having 1-20 carbon atoms, M' represents an alkali metal, ammonium, quaternary ammonium, or phosphonium, M" represents an alkaline earth metal, x represents an integer of 0-3, and y represents an integer of 0-2).]

In general formula (A), although M represents nickel or palladium, it is preferable that the valence of the M should be 2.

Here, the term "valence of the M" means the formal oxidation number used in organometallic chemistry. Specifically, in cases when the electron pairs in the bonds in which a certain element participates are allocated to elements having higher electronegativity, then that term means the number of charges remaining on the atom of that element.

For example, in the case where M, $R^1$, and $L^1$ in general formula (A) are a nickel atom, a phenyl group, and pyridine, respectively, and the nickel atom (M) has formed bonds with the adjoining atoms, i.e., the phosphorus atom, the oxygen atom, a carbon atom of the phenyl group ($R^1$), and the nitrogen atom of the pyridine ($L^1$), then the formal oxidation number of the nickel atom, i.e., the valence of the nickel atom, is 2. The reason for this is as follows. According to the definition, the electron pairs in these bonds are allocated to the oxygen, carbon, and nitrogen atoms which are higher in electronegativity than the nickel atom, and charges are 0 for the phosphorus atom, −1 for the oxygen atom, −1 for the phenyl group, and 0 for the pyridine. Since the complex as a whole is electrically neutral, the charge remaining on the nickel atom is +2.

Examples of the divalent M include nickel(II) and palladium(II).

In general formula (A), $R^1$ represents a hydrogen atom or a hydrocarbon group which has 1-20 carbon atoms and may contain a heteroatom. It is thought that a polymerization or copolymerization reaction is initiated by insertion of a monomer ingredient into the bond between the M and $R^1$. Consequently, in case where the number of carbon atoms of the $R^1$ is too large, the complex tends to be difficult to handle. It is hence preferable that $R^1$ should have 1-16 carbon atoms, more preferably 1-10 carbon atoms.

Specific examples of $R^1$ include hydride, methyl, ethyl, n-propyl, isopropyl, n-butyl, isobutyl, n-hexyl, n-octyl, n-decyl, n-dodecyl, cyclopentyl, cyclohexyl, benzyl, phenyl, p-methylphenyl, trimethylsilyl, triethylsilyl, and triphenylsilyl.

In general formula (A), $L^1$ represents a ligand which has coordinated to the M. Ligand $L^1$ is a hydrocarbon compound that has 1-20 carbon atoms and that has an oxygen, nitrogen, or sulfur atom as an atom capable of forming a coordination bond. Also usable as the $L^1$ is a hydrocarbon compound (which may have a heteroatom) which has a carbon-carbon unsaturated bond capable of coordinating to transition metals. The number of carbon atoms of $L^1$ is preferably 1-16, more preferably 1-10. It is preferable that the $L^{1'}$ which has coordinated to the M in general formula (A), should be a compound having no charge. Preferred examples of $L^1$ include pyridine and analogues thereof, piperidine and analogues thereof, alkyl ethers, aryl ethers, alkyl aryl ethers, cyclic ethers, alkyl nitrile derivatives, aryl nitrile derivatives, alcohols, amides, aliphatic esters, aromatic esters, amines, and cyclic unsaturated hydrocarbons. More preferred examples of $L^1$ include pyridine and analogues thereof, cyclic ethers, aliphatic esters, aromatic esters, and cycloolefins. Especially preferred examples of $L^1$ include pyridine, lutidine (dimethylpyridine), picoline (methylpyridine), and $R^9CO_2R^8$ ($R^8$ and $R^9$ are as defined above).

Incidentally, $R^1$ and $L^1$ may be bonded to each other to form a ring. Examples of such case include a cycloocta-1-enyl group, and this also is a preferred mode in this embodiment.

In general formula (A), $R^2$ and $R^3$ each independently represent a hydrocarbon group which has 1-30 carbon atoms and may contain a heteroatom, and $R^2$ and $R^3$ may be bonded to each other to form a ring. The $R^2$ and $R^3$ are located in the vicinity of the metal M, and sterically and/or electronically interact with the M. From the standpoint of producing this effect, it is preferable that $R^2$ and $R^3$ should be bulky. The number of carbon atoms of each of $R^2$ and $R^3$ is preferably 3-30, more preferably 6-30.

In $R^2$ and $R^3$, examples of the heteroatoms contained in the heteroatom-containing groups include oxygen, nitrogen, phosphorus, sulfur, selenium, silicon, fluorine, and boron. Preferred of these heteroatoms are oxygen, silicon, and fluorine. Examples of heteroatom-containing groups containing such heteroatoms are as follows: examples of oxygen-containing groups include alkoxy groups, aryloxy groups, acyl groups, aryloyl groups, and carboxylate groups; examples of nitrogen-containing groups include amino groups and amide groups; examples of sulfur-containing groups include thioalkoxy groups and thioaryloxy; examples of phosphorus-containing substituents include a phosphino group; examples of selenium-containing groups include selenyl groups; examples of silicon-containing groups include trialkylsilyl groups, dialkylarylsilyl groups, and alkyldiarylsilyl groups; examples of fluorine-containing groups include fluoroalkyl groups and fluoroaryl groups; and examples of boron-containing groups include alkylboron groups and arylboron groups. Most preferred of these heteroatom-containing groups are alkoxy groups or aryloxy groups.

Preferred heteroatoms contained in such heteroatom-containing groups are ones which are capable of coordinating to transition metals. Specific examples of heteroatom-containing groups which contain such a heteroatom capable of coordinating to transition metals include the following.

Examples of oxygen-containing groups include alkoxy groups such as methoxy, ethoxy, n-propoxy, isopropoxy, n-butoxy, and t-butoxy, aryloxy groups such as phenoxy, p-methylphenoxy, and p-methoxyphenoxy, acyl groups such as acetyl, aryloyl groups such as benzoyl, an acetoxy group, and carboxylate groups such as ethyl carboxylate, t-butyl carboxylate, and phenyl carboxylate. Examples of nitrogen-containing groups include dialkylamino groups such as dimethylamino, diethylamino, di-n-propylamino, and dicyclohexylamino. Examples of sulfur-containing groups include thioalkoxy groups such as thiomethoxy, thioethoxy, thio-n-propoxy, thioisopropoxy, thio-n-butoxy, thio-t-butoxy, and thiophenoxy and thioaryloxy groups such as p-methylthiophenoxy and p-methoxythiophenoxy. Examples of phosphorus-containing substituents include dialkylphosphino groups such as dimethylphosphino, diethylphosphino, di-n-propylphosphino, and dicyclohexylamino. Examples of selenium-containing groups include selenyl groups such as methylselenyl, ethylselenyl, n-propylselenyl, n-butylselenyl, t-butylselenyl, and phenylselenyl.

Although $R^2$ and $R^3$ in general formula (A) each independently are a hydrocarbon group which has 1-30 carbon atoms and may contain a heteroatom, more specific examples thereof include linear hydrocarbon groups which may contain a heteroatom, branched hydrocarbon groups which may contain a heteroatom, alicyclic hydrocarbon groups which may contain a heteroatom, and aryl groups which may contain a heteroatom. As stated above, it is preferable that $R^2$ and $R^3$ should be bulky. Consequently, alicyclic hydrocarbon groups which may contain a heteroatom or aryl groups which may contain a heteroatom are preferred of those. Most preferred are aryl groups which may contain a heteroatom. Examples of such aryl groups include phenyl, naphthyl, and anthracenyl.

In $R^2$ and $R^3$, in the case where any of the heteroatom-containing groups is bonded to the aromatic framework of any of these aryl groups, the mode of bonding may be one in which the heteroatom-containing group is directly bonded to the aromatic framework or may be one in which the heteroatom-containing group is bonded to the aromatic framework through a spacer such as one or more methylene groups. In the case where the heteroatom-containing group is bonded to the aromatic framework through a spacer such as one or more methylene groups, the number of methylene groups is preferably 1. With respect to the substitution position, a position in the aromatic framework in $R^2$ or $R^3$ which is ortho to the carbon atom bonded to the phosphorus atom is preferred. Thus, a spacial arrangement can be attained so that the heteroatoms in the $R^2$ and $R^3$ interact with the M.

Preferred specific examples of $R^2$ and $R^3$ include 2,6-dimethoxyphenyl, 2,4,6-trimethoxyphenyl, 4-methyl-2,6-dimethoxyphenyl, 4-t-butyl-2,6-dimethoxyphenyl, 1,3-dimethoxy-2-naphthyl, 2,6-diethoxyphenyl, 2,4,6-triethoxyphenyl, 4-methyl-2,6-diethoxyphenyl, 4-t-butyl-2,6-diethoxyphenyl, 1,3-diethoxy-2-naphthyl, 2,6-diphenoxyphenyl, 2,4,6-triphenoxyphenyl, 4-methyl-2,6-diphenoxyphenyl, 4-t-butyl-2,6-diphenoxyphenyl, 2-methoxy-6-phenoxyphenyl, 2-methoxy-4-t-butyl-6-phenoxyphenyl, 2,4,6-tri(methoxymethyl)phenyl, 4-methyl-2,6-di(methoxymethyl)phenyl, 4-t-butyl-2,6-di(methoxymethyl)phenyl, 1,3-di(methoxymethyl)-2-naphthyl, 2,6-di(phenoxymethyl)phenyl, 2,4,6-tri(phenoxymethyl)phenyl, 4-methyl-2,6-di(phenoxymethyl)phenyl, 4-t-butyl-2,6-di(phenoxymethyl)phenyl, 1,3-di(phenoxymethyl)-2-naphthyl, 2,6-di(2-methoxyethyl)phenyl, 2,4,6-tri(2-methoxyethyl)phenyl, 4-methyl-2,6-di(2-methoxyethyl)phenyl, 4-t-butyl-2,6-di(2-methoxyethyl)phenyl, 1,3-di(2-methoxyethyl)-2-naphthyl, 2,6-di(2-phenoxyethyl)phenyl, 2,4,6-tri(2-phenoxyethyl)phenyl, 4-methyl-2,6-di(2-phenoxyethyl)phenyl, 4-t-butyl-2,6-di(2-phenoxyethyl)phenyl, and 1,3-di(2-phenoxyethyl)-2-naphthyl.

Preferred of these are 2,6-dimethoxyphenyl, 2,4,6-trimethoxyphenyl, 4-methyl-2,6-dimethoxyphenyl, 4-t-butyl-2,6-dimethoxyphenyl, 1,3-dimethoxy-2-naphthyl, 2,6-diethoxyphenyl, 2,4,6-triethoxyphenyl, 4-methyl-2,6-diethoxyphenyl, 4-t-butyl-2,6-diethoxyphenyl, 1,3-diethoxy-2-naphthyl, 2,6-diphenoxyphenyl, 2,4,6-triphenoxyphenyl, 4-methyl-2,6-diphenoxyphenyl, 4-t-butyl-2,6-diphenoxyphenyl, 2-methoxy-6-phenoxyphenyl, and 2-methoxy-4-t-butyl-6-phenoxyphenyl.

In general formula (A), $R^4$ to $R^7$ each independently represent a hydrogen atom, a halogen atom, a hydrocarbon group which has 1-30 carbon atoms and may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2M'$, or an epoxy-containing group (where $R^8$ represents a hydrocarbon group having 1-20 carbon atoms, $R^9$ represents a hydrogen atom or a hydrocarbon group having 1-20 carbon atoms, M' represents an alkali metal, ammonium, quaternary ammonium, or phosphonium, M" represents an alkaline earth metal, x represents an integer of 0-3, and y represents an integer of 0-2).

Preferred examples of $R^4$ to $R^6$ include hydrogen, fluorine, chlorine, and bromine atoms, methyl, ethyl, isopropyl, phenyl, trifluoromethyl, pentafluorophenyl, trimethylsilyl, methoxy, ethoxy, phenoxy, nitrile, trimethoxysilyl, triethoxysilyl, trimethylsiloxy, trimethoxysiloxy, sodium sulfonates, potassium sulfonates, sodium phosphate, and potassium phosphate. Especially preferred examples thereof include hydrogen and fluorine atoms, methyl, phenyl, trifluoromethyl, pentafluorophenyl, nitrile, trimethylsilyl, methoxy, phenoxy, trimethoxysilyl, triethoxysilyl, trimethylsiloxy, trimethoxysiloxy, sodium sulfonates, and sodium phosphate.

It is preferable that $R^7$ should be bulky and have 3-30 carbon atoms. Specific examples thereof include: hydrocarbon groups such as n-butyl, isobutyl, t-butyl, phenyl, 1-naphthyl, 2-naphthyl, 1-anthracenyl, 2-anthracenyl, 9-anthracenyl, 4-t-butylphenyl, 2,4-di-t-butylphenyl, 9-fluorenyl, and cyclohexyl; and heteroatom-containing hydrocarbon groups including trisubstituted silyl groups such as trimethylsilyl, triethylsilyl, tri-n-propylsilyl, dimethylphenylsilyl, methyldiphenylsilyl, and triphenylsilyl and halogenated aryl groups such as 2,6-difluorophenyl, 2,4,6-trifluorophenyl, and pentafluorophenyl.

More preferred of these are t-butyl, phenyl, 1-naphthyl, 2-naphthyl, 1-anthracenyl, 2-anthracenyl, 9-anthracenyl, 4-t-butylphenyl, 2,4-di-t-butylphenyl, 9-fluorenyl, cyclohexyl, trimethylsilyl, triethylsilyl, dimethylphenylsilyl, methyldiphenylsilyl, 2,6-difluorophenyl, 2,4,6-trifluorophenyl, pentafluorophenyl, and the like.

Even more preferred are t-butyl, phenyl, 1-anthracenyl, 2-anthracenyl, 9-anthracenyl, 9-fluorenyl, trimethylsilyl, triethylsilyl, dimethylphenylsilyl, methyldiphenylsilyl, pentafluorophenyl, and the like.

(i-2) Method for Synthesizing Phosphine-Phenolate Complex (A)

The phosphine-phenolate complex (A) (hereinafter also referred to simply as "complex (A)"), which is suitable for use in this embodiment, can be obtained by reacting one or more compounds represented by the following formula (B) and/or formula (C) with a transition metal complex ingredient (D) containing a transition metal M, the ingredient (D) being described later.

[Chem. 2]

[In formula (B) or (C), Z represents a hydrogen atom or a leaving group, and m indicates the valence of the Z. $R^2$, $R^3$, $R^4$, $R^5$, $R^6$, and $R^7$ are the same as in the explanation of general formula (A) given above.]

Although Z in general formula (B) is a hydrogen atom or a leaving group, specific examples thereof include a hydrogen atom, an $R^9SO_2$ group (where $R^9$ is as defined above), and a $CF_3SO_2$ group.

General formula (C) is in the form of an anion, and any desired counter cation therefor can be used so long as the counter cation does not inhibit the reaction with the transition metal complex ingredient (D). Examples of the counter cation include ammonium, quaternary ammonium or phosphonium, and ions of metals belonging to Groups 1 to 14 of the periodic table.

Preferred of these are $NH_4^+$, $R^9_4N^+$ (where $R^9$ is as defined above, and the four $R^9$ moieties may be the same or different), $R^9_4P^+$ (where $R^9$ is as defined above, and the four $R^9$ moieties may be the same or different), $Li^+$, $Na^+$, $K^+$, $Mg^{2+}$, $Ca^{2+}$, and $Al^{3+}$. More preferred are $R^9_4N^+$ (where $R^9$ is as defined above, and the four $R^9$ moieties may be the same or different), $Li^+$, $Na^+$, and $K^+$.

The substances represented by general formulae (B) and (C) can be synthesized by known synthesis methods.

As the transition metal complex ingredient (D), use is made of any of ones which are capable of reacting with a compound represented by general formula (B) or (C) to form a complex having polymerization activity. These ingredients are sometimes called precursors.

For example, as the transition metal complex ingredient (D) containing nickel, use can be made of bis(1,5-cyclooctadiene)nickel(0), complexes represented by the general formula $(CH_2CR'CH_2)_2Ni$ (hereinafter R' represents a hydrogen atom, a halogen atom, a hydrocarbon group which has 1-30 carbon atoms and may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2M'$, or an epoxy-containing group, wherein $R^8$, $R^9$, M', and M" are as defined above, x represents an integer of 0-3, and y represents an integer of 0-2), bis(cyclopentadienyl)nickel(2), complexes represented by the general formula Ni(CH$_2$SiR'$_3$)$_2$L$^1_2$, and complexes represented by the general formula NiR'$_2$L$^1_2$ (where L$^1$ is the same as in the explanation of general formula (A)).

As the transition metal complex ingredient (D) containing a transition metal belonging to Group 9, 10, or 11, use can be made of the following general formula (3).

(In general formula (3), M is a transition metal belonging to Group 9, 10, or 11, R' and L$^1$ are as defined above, and p and q are integers of 0 or larger which satisfy the valence of the M.)

Preferred of such transition metal complex ingredients (D) are bis(1,5-cyclooctadiene)nickel(0), complexes represented by the general formula (CH$_2$CR'CH$_2$)$_2$Ni, complexes represented by the general formula Ni(CH$_2$SiR'$_3$)$_2$L$^1_2$, complexes represented by the general formula NiR'$_2$L$^1_2$, Pd(dba)$_2$, Pd$_2$(dba)$_3$, Pd$_3$(dba)$_4$ (where dba represents dibenzylideneacetone), and Pd(OCOCH$_3$)$_2$.

Especially preferred are bis(1,5-cyclooctadiene)nickel(0), (CH$_2$CHCH$_2$)$_2$Ni, (CH$_2$CMeCH$_2$)$_2$Ni, Ni(CH$_2$SiMe$_3$)$_2$(Py)$_2$ (hereinafter Py represents pyridine), Ni(CH$_2$SiMe$_3$)$_2$(Lut)$_2$ (hereinafter Lut represents 2,6-lutidine), NiPh$_2$(Py)$_2$, Ni(Ph)$_2$(Lut)$_2$, Pd(dba)$_2$, Pd$_2$(dba)$_3$, Pd$_3$(dba)$_4$, and Pd(OCOCH$_3$)$_2$.

A complex (A) represented by general formula (A) is contained in the products of the reaction of a compound represented by general formula (B) or (C) with the transition metal complex ingredient (D), which contains the transition metal M to be contained in the complex (A).

The reaction products can be obtained by causing the compound represented by general formula (B) or (C) to be in contact with the transition metal complex ingredient (D) in such a proportion that [(B)+(C)]:(D) is, for example, form 1:99 to 99:1 (molar ratio), in an organic solvent, e.g., toluene or benzene, with a temperature of 0-100° C. at a reduced to elevated pressure for about 1 second to 24 hours.

In the case of using a toluene or benzene solution of bis(1,5-cyclooctadiene)nickel(0) as the transition metal complex ingredient (D), the color of the solution changes from yellow to, for example, red, making it possible to ascertain the formation of reaction products.

After the reaction between the compound represented by general formula (B) or (C) with the transition metal complex ingredient (D), that portion of the transition metal complex ingredient (D) other than the transition metal M is replaced with that portion of general formula (B) other than the Z or with general formula (C), thereby yielding a metal complex represented by general formula (A). Although it is desirable that this replacement reaction should proceed quantitatively, the reaction need not proceed completely in some cases.

After completion of the reaction, ingredients other than the complex (A) which are derived from the compounds represented by general formulae (B), (C), and (D) are present besides the complex (A). However, these other ingredients may be removed or may be allowed to remain, when a polymerization reaction or a copolymerization reaction is conducted. In general, it is preferred to remove these ingredients, because high activity is obtained thereby.

When a reaction is conducted, the L$^1$ may be caused to coexist. For example, in cases when nickel or palladium was used as the M, there are cases where the stability of the purified complex (A) is enhanced by causing the L$^1$ having Lewis-basic properties to coexist in the system. In such cases, it is preferred to cause the L$^1$ to coexist, unless the L$^1$ inhibits the polymerization reaction or copolymerization reaction.

In this embodiment, use may be made of a method in which the reaction is conducted beforehand in a vessel other than the reactor to be used for polymerizing an α-olefin or copolymerizing an α-olefin with a (meth)acrylic ester and the complex (A) thus obtained is subjected to the polymerization of an α-olefin or to the copolymerization of an α-olefin with a (meth)acrylic ester. Alternatively, the reaction may be conducted in the presence of these monomers.

Furthermore, the reaction may be conducted in the reactor to be used for the polymerization of an α-olefin or for the copolymerization of an α-olefin with a (meth)acrylic ester. In this case, these monomers may be present or absent. With respect to the ingredients represented by general formulae (B) and (C), one ingredient represented by each general formula may be used alone or a plurality of ingredients represented by each general formula may be used in combination. Especially for the purpose of widening the molecular weight distribution or comonomer content distribution, it is useful to use such multiple ingredients in combination.

(ii-1) Phosphine-Sulfonate Complex (E)

Among the late-transition-metal complexes represented by formula (2), a phosphine-sulfonate complex (E) represented by the following general formula (E) is also preferred like the complex (A).

[Chem. 3]

(E)

[In formula (E), M represents nickel or palladium. P is phosphorus, S is sulfur, and O is oxygen. R$^{11}$ represents a hydrogen atom, a halogen atom, an alkyl group which has 1-30 carbon atoms and may contain a heteroatom, or an aryl group which has 6-30 carbon atoms and may contain a heteroatom. L$^2$ represents a ligand which has coordinated to the M. R$^{12}$ and R$^{13}$ each independently represent a hydrocarbon group which has 1-30 carbon atoms and may contain a heteroatom, and R$^{12}$ and R$^{13}$ may be bonded to each other to form a ring. R$^{14}$ to R$^{17}$ each independently represent a hydrogen atom, a halogen atom, a hydrocarbon group which has 1-30 carbon atoms and may contain a heteroatom, OR$^8$, CO$_2$R$^8$, CO$_2$M', C(O)N(R$^9$)$_2$, C(O)R$^8$, SR$^8$, SO$_2$R$^8$, SOR$^8$, OSO$_2$R$^8$, P(O)(OR$^8$)$_{2-y}$(R$^9$)$_y$, CN, NHR$^8$, N(R$^8$)$_2$, Si(OR$^9$)$_{3-x}$(R$^9$)$_x$, OSi(OR$^9$)$_{3-x}$(R$^9$)$_x$, NO$_2$, SO$_3$M', PO$_3$M'$_2$, PO$_3$M'', P(O)(OR$^8$)$_2$M', or an epoxy-containing group (where R$^8$ represents a hydrocarbon group having 1-20 carbon atoms, R$^9$ represents a hydrogen atom or a hydrocarbon group having 1-20 carbon atoms, M' represents an alkali metal, ammonium, quaternary ammonium, or phosphonium, M'' represents an alkaline earth metal, x represents an integer of 0-3, and y represents an integer of 0-2).]

In general formula (E), M is the same as in the explanation of general formula (A).

In general formula (E), R$^{11}$ represents a hydrogen atom, a halogen atom, an alkyl group which has 1-30 carbon atoms and may contain a heteroatom, or an aryl group which has 6-30 carbon atoms and may contain a heteroatom. Preferred as the heteroatoms are oxygen, nitrogen, silicon, and halogen atoms. More preferred are oxygen atoms.

In the case where $R^{11}$ is an alkyl group which has 1-30 carbon atoms and may contain a heteroatom, this alkyl group preferably is an alkyl group having 1-6 carbon atoms. Preferred examples thereof include methyl, ethyl, trifluoromethyl, acyl, and acetoxy groups.

In the case where $R^{11}$ is an aryl group which has 6-30 carbon atoms and may have a preferred heteroatom, this aryl group preferably is an aryl group having 6-13 carbon atoms. Preferred examples thereof include phenyl, tolyl, xylyl, phenanthryl, and pentafluorophenyl.

Especially preferred examples of $R^{11}$ among these include a hydrogen atom, methyl, and phenyl.

In general formula (E), $L^2$ represents a ligand which has coordinated to the M. It is preferable that ligand $L^2$ should be a hydrocarbon compound which has 1-20 carbon atoms and has an oxygen, nitrogen, or sulfur atom as an atom capable of coordinating to the M. Also usable as the $L^2$ is a hydrocarbon compound (which may contain a heteroatom) which has a carbon-carbon unsaturated bond capable of coordinating to transition metals.

The number of carbon atoms of $L^2$ is preferably 1-16, more preferably 1-10.

It is preferable that the $L^2$, which has coordinated to the M in general formula (E), should be a compound having no charge.

Preferred examples of $L^2$ include pyridine and analogues thereof, piperidine and analogues thereof, alkyl ethers, aryl ethers, alkyl aryl ethers, cyclic ethers, alkyl nitrile derivatives, aryl nitrile derivatives, alcohols, amides, aliphatic esters, aromatic esters, amines, and cyclic unsaturated hydrocarbons.

More preferred examples of $L^2$ include pyridine and analogues thereof, cyclic ethers, aliphatic esters, aromatic esters, and cycloolefins. Especially preferred examples of $L^2$ include pyridine, lutidine (dimethylpyridine), picoline (methylpyridine), and $R^9CO_2R^8$.

$R^{11}$ and $L^2$ may be united into one to form a t-allyl bonding mode represented by the following general formula (E-1). (The following formula (E-1) shows only the portion of general formula (E) where the M, $R^{11}$, and $L^2$ have been united into one to form a π-allyl bond.)

[Chem. 4]

(E-1)

[In formula (E-1), the $R^{10}$ moieties each independently represent a hydrogen atom, a halogen atom, a hydrocarbon group which has 1-30 carbon atoms and may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2M'$, or an epoxy-containing group (where $R^8$ represents a hydrocarbon group having 1-20 carbon atoms, $R^9$ represents a hydrogen atom or a hydrocarbon group having 1-20 carbon atoms, M' represents an alkali metal, ammonium, quaternary ammonium, or phosphonium, M" represents an alkaline earth metal, x represents an integer of 0-3, and y represents an integer of 0-2).]

In general formula (E-1), $R^{10}$ preferably is a hydrogen atom, methyl, ethyl, butyl, pentyl, hexyl, or phenyl.

In general formula (E), $R^{12}$ and $R^{13}$ each independently represent a hydrocarbon group which has 1-30 carbon atoms and may contain a heteroatom, and $R^{12}$ and $R^{13}$ may be bonded to each other to form a ring. The $R^{12}$ and $R^{13}$ are located in the vicinity of the metal M, and sterically and/or electronically interact with the M. From the standpoint of producing this effect, it is preferable that $R^{12}$ and $R^{13}$ should be bulky. The number of carbon atoms of each of $R^{12}$ and $R^{13}$ is preferably 3-30, more preferably 6-30.

It is preferable that $R^{12}$ and $R^{13}$ each should have an aromatic framework, and aryl groups which may contain a heteroatom are preferred.

In $R^{12}$ and $R^{13}$, a preferred substitution position at which the aromatic framework of each of these aryl groups has been substituted with a hydrocarbon group that may contain any of the heteroatoms shown above is a position in the aromatic framework in $R^{12}$ or $R^{13}$ which is ortho to the carbon atom bonded to the phosphorus atom. Thus, a spacial arrangement can be attained so that the heteroatoms in the $R^{12}$ and $R^{13}$ interact with the M.

The hydrocarbon group which may contain a heteroatom is a hydrocarbon group having 1-10 carbon atoms or an alkoxy or aryloxy group having 1-10 carbon atoms, which has oxygen.

Examples of the hydrocarbon group include methyl, ethyl, n-propyl, isopropyl, n-butyl, isobutyl, t-butyl, cyclopentyl, and cyclohexyl. Preferred of these are methyl, ethyl, n-propyl, isopropyl, n-butyl, and cyclohexyl. More preferred are methyl, ethyl, isopropyl, and cyclohexyl.

Preferred examples of the alkoxy or aryloxy group having 1-10 carbon atoms, which has oxygen, are methoxy, ethoxy, phenoxy, and 2-methylphenoxy, in particular, methoxy and phenoxy.

Preferred examples of $R^{12}$ and $R^{13}$ include 2-methylphenyl, 2,6-dimethylphenyl, 2-ethylphenyl, 2,6-diethylphenyl, 2-isopropylphenyl, 2,6-di(isopropyl)phenyl, 2-cyclohexylphenyl, 2,6-di(cyclohexyl)phenyl, 2-methoxyphenyl, 2,6-dimethoxyphenyl, 2-phenoxyphenyl, and 2,6-diphenoxyphenyl.

Preferred of these are 2-methylphenyl, 2-ethylphenyl, 2-isopropylphenyl, 2-cyclohexylphenyl, 2-methoxyphenyl, 2,6-dimethoxyphenyl, 2-phenoxyphenyl, and 2,6-diphenoxyphenyl.

Especially preferred examples include 2-isopropylphenyl, 2-cyclohexylphenyl, 2-methoxyphenyl, 2,6-dimethoxyphenyl, 2-phenoxyphenyl, and 2,6-diphenoxyphenyl.

In general formula (E), $R^{14}$ to $R^{17}$ each independently represent a hydrogen atom, a halogen atom, a hydrocarbon group which has 1-30 carbon atoms and may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2M'$, or an epoxy-containing group (where $R^8$ represents a hydrocarbon group having 1-20 carbon atoms, $R^9$ represents a hydrogen atom or a hydrocarbon group having 1-20 carbon atoms, M' represents an alkali metal, ammonium, quaternary ammonium, or phosphonium, M" represents an alkaline earth metal, x represents an integer of 0-3, and y represents an integer of 0-2).]

Preferred examples among these include hydrogen, fluorine, chlorine, and bromine atoms, methyl, ethyl, isopropyl, cyclohexyl, phenyl, trifluoromethyl, pentafluorophenyl, trimethylsilyl, dimethylphenylsilyl, methyldiphenylsilyl, triphenylsilyl, methoxy, ethoxy, phenoxy, 2-methylphenoxy, nitrile, trimethoxysilyl, triethoxysilyl, trimethylsiloxy, trimethoxysiloxy, sodium sulfonates, potassium sulfonates, sodium phosphate, and potassium phosphate. Especially preferred examples include a hydrogen atom, methyl, ethyl, isopropyl, cyclohexyl, phenyl, trifluoromethyl, pentafluorophenyl, trimethylsilyl, dimethylphenylsilyl, methyldiphenylsilyl, triphenylsilyl, methoxy, ethoxy, phenoxy, 2-methylphenoxy, trimethoxysilyl, triethoxysilyl, trimethylsiloxy, and trimethoxysiloxy.

Method for Synthesizing Complex (E)

The phosphine-sulfonate complex (E) (hereinafter also referred to as "complex (E)"), which is suitable for use in a production process according to this embodiment, can be obtained by reacting one or more compounds represented by the following general formula (F) and/or general formula (G) with the transition metal complex ingredient (H) which will be described later.

[Chem. 5]

[In formula (F) or (G), Z represents a hydrogen atom or a leaving group, and m indicates the valence of the Z. $R^{12}$, $R^{13}$, $R^{14}$, $R^{15}$, $R^{16}$, and $R^{17}$ are the same as in the explanation of general formula (E) given above.]

Although Z in general formula (F) is a hydrogen atom or a leaving group, specific examples thereof include a hydrogen atom, an $R^9SO_2$ group (where $R^9$ is as defined above), and a $CF_3SO_2$ group.

General formula (G) is in the form of an anion, and any desired counter cation therefor can be used so long as the counter cation does not inhibit the reaction with the transition metal complex ingredient (H). Examples of the counter cation include ammonium, quaternary ammonium or phosphonium, and ions of metals belonging to Groups 1 to 14 of the periodic table. Preferred of these are $NH_4^+$, $R^9_4N^+$ (where $R^9$ is as defined above, and the four $R^9$ moieties may be the same or different), $R^9_4P^+$ (where $R^9$ is as defined above, and the four $R^9$ moieties may be the same or different), $Li^+$, $Na^+$, $K^+$, $Mg^{2+}$, $Ca^{2+}$, and $Al^{3+}$. More preferred are $R^9_4N^+$ (where $R^9$ is as defined above, and the four $R^9$ moieties may be the same or different), $Li^+$, $Na^+$, and $K^+$.

The substances represented by general formulae (F) and (G) can be synthesized by known synthesis methods. The complex (E) is contained in the products of the reaction of a compound represented by general formula (F) or (G) with the transition metal complex ingredient (H), which contains the metal M.

As the transition metal complex ingredient (H) to be used in a production process according to this embodiment, use is made of any of ones which are capable of reacting with a compound represented by general formula (F) or (G) to form a complex having polymerization activity. These ingredients are sometimes called precursors.

The transition metal complex ingredient (H) is synthesized using, for example, bis(dibenzylideneacetone)palladium, tetrakis(triphenylphosphine)palladium, palladium sulfate, palladium acetate, bis(allylpalladium chloride), palladium chloride, palladium bromide, (cyclooctadiene)palladium (methyl) chloride, dimethyl(tetramethylethylenediamine)palladium, bis(cyclooctadiene)nickel, nickel chloride, nickel bromide, (tetramethylethylenediamine)nickel (methyl) chloride, dimethyl(tetramethylethylenediamine)nickel, (cyclooctadiene)nickel (methyl) chloride, or the like.

The complexation reaction may be conducted in the reactor to be used for the copolymerization of an α-olefin, or may be conducted in a vessel other than the reactor. After the complexation, the metal complex may be isolated and used as a catalyst or may be used as a catalyst without being isolated. It is also possible to conduct the complexation reaction in the presence of the porous support which will be described later.

One catalyst composition may be used alone in a production process according to this embodiment or a plurality of catalyst compositions may be used in combination in the process. Especially for the purpose of widening the molecular weight distribution or comonomer content distribution, it is useful to thus use multiple catalyst compositions in combination.

(III) Polymerization Reaction

The production process according to this embodiment includes a step in which an ethylene/unsaturated carboxylic acid ester copolymer is produced from ethylene and at least one unsaturated carboxylic acid ester using a late-transition-metal complex catalyst.

With respect to the late-transition-metal complex catalyst, the complex (A) or the complex (E) is suitable for use as a catalyst component for the polymerization or copolymerization. As described above, the complex (A) can be formed by reacting a compound represented by general formula (B) or (C) with the transition metal complex ingredient (D). Meanwhile, the complex (E) can be formed by reacting a compound represented by general formula (F) or (G) with the transition metal complex ingredient (H).

In the case of using the complex (A) or the complex (E) as a catalyst component, the complex in an isolated form may be used or the complex deposited on a support may be used. The deposition may be conducted in the reactor to be used for the polymerization of an α-olefin or copolymerization of an α-olefin with a (meth)acrylic ester, in the presence or absence of these monomers, or may be conducted in a vessel other than the reactor.

Any desired support can be used therefor, unless the use thereof departs from the spirit of the invention. In general, inorganic oxides and polymer supports are suitable.

Specific examples thereof include $SiO_2$, $Al_2O_3$, $MgO$, $ZrO_2$, $TiO_2$, $B_2O_3$, $CaO$, $ZnO$, $BaO$, and $ThO_2$ or mixtures thereof. Also usable are mixed oxides such as $SiO_2$—$Al_2O_3$, $SiO_2$—$V_2O_5$, $SiO_2$—$TiO_2$, $SiO_2$—$MgO$, and $SiO_2$—$Cr_2O_3$. Furthermore usable are inorganic silicates, polyethylene supports, polypropylene supports, polystyrene supports, poly(acrylic acid) supports, poly(methacrylic acid) supports, poly(acrylic ester) supports, polyester supports, polyamide supports, polyimide supports, and the like.

These supports are not particularly limited in particle diameter, particle diameter distribution, pore volume, specific surface area, etc., and any desired ones can be used.

The inorganic silicates usable as the support include clays, clay minerals, zeolites, diatomaceous earth, and the like. These silicates may be synthetic products or naturally occurring minerals.

Examples of the clays and clay minerals include allophane group minerals such as allophane, kaolin group minerals such as dickite, nacrite, kaolinite, and anorthite, halloysite group minerals such as metahalloysite and halloysite, serpentine group minerals such as chrysotile, lizardite, and antigorite, smectites such as montmorillonite, sauconite, beidellite, nontronite, saponite, and hectorite, vermiculite minerals such as vermiculite, mica minerals such as illite, sericite, and glauconite, and other minerals including attapulgite, sepiolite, palygorskite, bentonite, kibushi clay, gairome clay, hisingerite, pyrophyllite, and chlorite group minerals. These minerals may be in the form of mixed layers.

Examples of the synthetic products include synthetic micas, synthetic hectorite, synthetic saponite, and synthetic taeniolite. Preferred of these examples are kaolin group minerals such as dickite, nacrite, kaolinite, and anorthite, halloysite group minerals such as metahalloysite and halloysite, serpentine group minerals such as chrysotile, lizardite, and antigorite, smectites such as montmorillonite, sauconite, beidellite, nontronite, saponite, and hectorite, vermiculite minerals such as vermiculite, mica minerals such as illite, sericite, and glauconite, synthetic micas, synthetic hectorite, synthetic saponite, and synthetic taeniolite. Especially preferred are smectites such as montmorillonite, sauconite, beidellite, nontronite, saponite, and hectorite, vermiculite minerals such as vermiculite, synthetic micas, synthetic hectorite, synthetic saponite, and synthetic taeniolite.

Although these supports may be used as such, the supports may be subjected to an acid treatment with hydrochloric acid, nitric acid, sulfuric acid, or the like and/or a treatment with a salt such as LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, or $Al_2(SO_4)_3$. This treatment may be conducted by a method in which the corresponding acid and base are mixed together to yield the slat in the reaction system. Shape control by pulverization, granulation, etc. and a drying treatment may be performed.

The polymerization reaction can be conducted in the presence or absence of a hydrocarbon solvent such as propane, n-butane, isobutene, n-hexane, n-heptane, toluene, xylene, cyclohexane, or methylcyclohexane, a liquid such as a liquefied α-olefin, or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol, or ethylene glycol. A mixture of two or more of the liquid compounds shown above may be used as the solvent. Furthermore, ionic liquids are also usable as the solvent. From the standpoint of obtaining high polymerization activity and a high molecular weight, those hydrocarbon solvents and ionic liquids are more preferred.

The polymerization reaction can be performed in the presence or absence of known additives. Preferred as the additives are a polymerization inhibitor which serves to inhibit free-radical polymerization and an additive which has the function of stabilizing the copolymer being yielded. Examples of such preferred additives include quinone derivatives and hindered phenol derivatives. Specifically, hydroquinone monomethyl ether, 2,6-di-t-butyl-4-methylphenol (BHT), a product of reaction between trimethylaluminum and BHT, and a product of reaction between an alkoxide of tetravalent titanium and BHT are usable.

Furthermore, an inorganic filler and/or an organic filler may be used as an additive to conduct the polymerization in the presence of these fillers. Moreover, L or an ionic liquid may be used as an additive.

Preferred additives further include Lewis bases. By selecting an appropriate Lewis base, improvements can be attained in activity, molecular weight, and the copolymerizability of the acrylic esters. The amount of the Lewis base may be 0.0001-1,000 equivalents, preferably 0.1-100 equivalents, more preferably 0.3-30 equivalents, to the transition metal M contained in the catalyst component present in the polymerization system. Methods for adding a Lewis base to the polymerization system are not particularly limited, and any desired method can be used. For example, the Lewis base may be added as a mixture thereof with the catalyst component or as a mixture thereof with a monomer, or may be added to the polymerization system separately from the catalyst component and monomers. A plurality of Lewis bases may be used in combination. The Lewis base to be used may be the same as or different from the $L^1$ according to the invention.

Examples of the Lewis base include aromatic amines, aliphatic amines, alkyl ethers, aryl ethers, alkyl aryl ethers, cyclic ethers, alkyl nitriles, aryl nitriles, alcohols, amides, aliphatic esters, aromatic esters, phosphates, phosphites, thiophenes, thianthrenes, thiazole and analogues thereof, oxazole and analogues thereof, morpholine and analogues thereof, and cyclic unsaturated hydrocarbons. Especially preferred Lewis bases among these are aromatic amines, aliphatic amines, cyclic ethers, aliphatic esters, and aromatic esters. Preferred Lewis bases among these are pyridine derivatives, pyrimidine derivatives, piperidine derivatives, imidazole derivatives, aniline derivatives, triazine derivatives, pyrrole derivatives, and furan derivatives.

Specific examples of such Lewis base compounds include pyridine, pentafluoropyridine, 2,6-lutidine, 2,4-lutidine, 3,5-lutidine, pyrimidine, N,N-dimethylaminopyridine, N-methylimidazole, 2,2'-bipyridine, aniline, piperidine, 1,3,5-triazine, 2,4,6-tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo[5.4.0]undec-7-ene, 1,4-diazabicyclo[2,2,2]octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenyl phosphite, triphenyl phosphate, tripyrrolidinophosphine, and tris(pyrrolidino)borane.

In this embodiment, modes of polymerization are not particularly limited. For example, use can be made of: slurry polymerization in which at least some of the yielded polymer forms a slurry in the medium; bulk polymerization in which a liquefied monomer itself is used as a medium; vapor-phase polymerization in which the polymerization is conducted in vaporized monomers; or high-pressure ionic polymerization in which at least some of the yielded polymer dissolves in a monomer which has been liquefied at a high temperature and a high pressure. Furthermore, the mode of polymerization may be any of batch polymerization, semi-batch polymerization, and continuous polymerization. The polymerization may be living polymerization, or may be conducted while inducing chain transfers. Moreover, a so-called chain transfer agent (CSA) may be further used to conduct chain shuttering or coordinative chain transfer polymerization (CCTP).

The unreacted monomers and the medium may be separated from the yielded copolymer and recycled and used. In the case of recycling, these monomers and the medium may be purified and reused or may be reused without being purified. For separating the yielded copolymer from the unreacted monomers and medium, conventionally known methods can be used. For example, use can be made of methods such as filtration, centrifugal separation, solvent extraction, and reprecipitation with a poor solvent.

There are no particular limitations on polymerization temperature, polymerization pressure, and polymerization time. Usually, however, such conditions can be selected from the following ranges to attain optimal setting, while taking account of production efficiency and process capacity. Namely, a polymerization temperature can be selected from the range of usually from −20° C. to 290° C., preferably 0-250° C., and a copolymerization pressure can be selected form the range of 0.1-300 MPa, preferably 0.3-250 MPa. Furthermore, a polymerization time can be selected from the range of 0.1 minute to 10 hours, preferably 0.5 minutes to 7 hours, more preferably 1 minute to 6 hours.

The polymerization reaction can be conducted in a common inert gas atmosphere. For example, a nitrogen, argon, or carbon dioxide atmosphere can be used, and use of a nitrogen atmosphere is preferred. Inclusion of a small amount of oxygen or air is permissible.

Feeding of the catalyst and the monomers to a reactor is also not particularly limited, and various feeding methods are usable in accordance with purposes. In the case of batch polymerization, for example, embodiment can be made of a method in which given amounts of the monomers are fed beforehand and the catalyst is supplied thereto. In this case, the monomers and the catalyst may be supplemented to the reactor. Meanwhile, in the case of continuous polymerization, embodiment can be made of a method in which the monomers and the catalyst are continuously or intermittently supplied at given rates to the reactor to continuously conduct the polymerization reaction.

With respect to control of the composition of the copolymer, embodiment can be generally made of a method in which a plurality of monomers are fed to a reactor and the feed proportion therebetween is changed to thereby control the composition. Other examples include: a method in which copolymerization proportion control is performed by utilizing a difference in monomer reactivity ratio due to a difference in catalyst structure; and a method in which copolymerization proportion control is performed by utilizing the polymerization temperature dependence of monomer reactivity ratio.

For controlling the molecular weight of the polymer, conventionally known methods can be used. Examples thereof include: a method in which the polymerization temperature is controlled to control the molecular weight; a method in which the monomer concentrations are controlled to control the molecular weight; a method in which a chain transfer agent is used to control the molecular weight; and to control the molecular weight by controlling the structures of the ligands contained in the transition metal complex. In the case of using a chain transfer agent, a conventionally known chain transfer agent can be used. For example, hydrogen, an alkylmetal, or the like can be used.

In the case where a (meth)acrylic ester ingredient itself serves as a kind of chain transfer agent, molecular-weight control can be performed also by controlling the proportion of the (meth)acrylic ester ingredient to the ethylene ingredient or by controlling the concentration of the (meth)acrylic ester ingredient. In the case of performing molecular-weight control by controlling the structures of the ligands contained in the transition metal complex, it is possible to utilize the tendency that the molecular weight is generally increased by controlling the kind, number, and disposition of each of the heteroatom-containing groups in $R^2$ and $R^3$ or in $R^{12}$ and $R^{13}$ or by disposing a bulky substituent in the vicinity of the metal M. It is preferable that an electron-donating group, such as an aryl group or a heteroatom-containing substituent, should be disposed so that the electron-donating group can interact with the metal M. Whether such an electron-donating group is capable of interacting with the metal M can generally be determined by measuring the distance between the electron-donating group and the metal M using a molecular model or through a molecular orbital calculation.

(2) Step of Heating Ethylene/Unsaturated Carboxylic Acid Ester

The production process of this embodiment includes, as step (2), a step in which after an ethylene/unsaturated carboxylic acid ester copolymer is produced by the step described above, the ethylene/unsaturated carboxylic acid ester copolymer obtained is heated to thereby convert this copolymer into an ethylene/unsaturated carboxylic acid copolymer.

The temperature at which the ethylene/unsaturated carboxylic acid ester copolymer is heat-treated is not particularly limited so long as the temperature is a reaction temperature at which the ester groups can be converted to carboxylic acid groups. Too low reaction temperatures are undesirable because the ester groups partly remain unconverted to carboxylic acid groups, while too high reaction temperatures are undesirable because decarbonylation and the decomposition of the copolymer proceed. For example, the reaction temperature is preferably in the range of 150-350° C., more preferably in the range of 180-300° C., even more preferably in the range of 190-270° C.

The reaction time varies depending on the reaction temperature, reactivity of the ester moieties, etc. However, the reaction time is usually 1 minute to 10 hours, more preferably 2 minutes to 5 hours, even more preferably 2 minutes to 3 hours. Reactors usable for the reaction method are not particularly limited, and any method capable of substantially evenly stirring the copolymer can be used without particular limitations. Embodiment may be made of a glass vessel or AC equipped with a stirrer, or use can be made of any of conventionally known kneading machines such as Brabender Plastograph, a single-screw or twin-screw extruder, an intensive-screw type kneading machine, a Banbury mixer, a kneader, and a roll mill.

The reaction atmosphere is not particularly limited. However, it is generally preferred to conduct the reaction in an inert gas stream. Examples of usable inert gases include nitrogen, argon, and carbon dioxide atmospheres. Inclusion of a small amount of oxygen or air is permissible.

The ethylene/unsaturated carboxylic acid copolymer obtained in step (2) contains at least ethylene and an unsaturated carboxylic acid as constituent monomers. Examples of the unsaturated carboxylic acid include the unsaturated carboxylic acids obtained by converting the ester groups of the unsaturated carboxylic acid esters as constituent monomers for the ethylene/unsaturated carboxylic acid ester into carboxylic acid groups. Specific examples of the unsaturated carboxylic acid include acrylic acid and methacrylic acid.

The ethylene/unsaturated carboxylic acid ester or the ethylene/unsaturated carboxylic acid copolymer may contain stabilizers such as an antioxidant, light stabilizer, ultraviolet absorber, metal soap, and hydrochloric-acid absorber and additives such as a nucleating agent, lubricant, antistatic agent, and antiblocking agent, unless the inclusion of these ingredients departs from the spirit of the invention. Specific examples of such additives include phenol-based stabilizers represented by 2,6-di-t-butyl-p-cresol (BHT), tetrakis(methylene-3-(3,5-di-t-butyl-4-hydroxyphenyl)propionato)methane (trade name "IRGANOX 1010", manufactured by BASF Japan Ltd.), and n-octadecyl 3-(4'-hydroxy-3,5'-di-t-butylphenyl)propionate (trade name "IRGANOX 1074", manufactured by BASF A.G.), phosphite-based stabilizers represented by bis(2,4-di-t-butylphenyl)pentaerythritol diphosphite, lubricants represented by higher fatty acid amides and higher fatty acid esters, antistatic agents such as glycerin esters, sorbitan acid esters, or polyethylene glycol esters of fatty acids having 8-22 carbon atoms, and blocking agents represented by silica, calcium carbonate, and talc.

EXAMPLES

The present invention will be explained in more detail in the following Examples and Comparative Example, but the invention should not be construed as being limited by the following Examples.

In the following Synthesis Example, the operation was conducted in a purified nitrogen atmosphere and dehydrated and deoxidized solvents were used, unless otherwise indicated.

1. Preparation of Solvents, Monomers, and Nitrogen

Purified nitrogen used was one which had undergone dehydration with molecular sieve 4A (MS4A) that had been calcined in a nitrogen atmosphere. Ethylene and toluene which both had been dehydrated with MS4A that had been calcined in a nitrogen atmosphere were used.

t-Butyl acrylate (tBA) (manufactured by Wako Pure Chemical Ltd.) was used after being treated with Inhibitor Remover (manufactured by Aldrich Co.).

2. Analysis Methods (1) GPC Analysis (Mw/Mn):
Measurement conditions (high-temperature SEC)
Apparatus: GPCV2000 (manufactured by Waters Inc.)
Detector: RI (refractive index)
Mobile phase: ODCB (135° C.)
Flow rate: 1.0 mL/min
Injection amount: 0.05 wt % × 524.5 μL
Columns: Tosoh TSKgel GMH-HT (30 cm×4)

A specimen was dissolved in ODCB (dissolution temperature, 135° C.) to which BHT had been added (0.5 g/L), in pretreatment device PL-SP260VS for high-temperature GPC, and the solution was filtered with a glass filter and then examined.

Calibration Method (molecular weight determined through measurement in 135° C. ODCB and calculation for PE):

A calibration curve for PE was calculated from retention times of standard PSTs by the generalized calibration curve method.

The numerals used were: $K_{PST}$=1.38E-4, $\alpha_{PST}$=0.70, $K_{PE}$=4.77E-4, and $\alpha_{PE}$=0.70.

An approximate expression used for the calibration curve was a cubic equation.

(2) DSC Analysis (Tm):

A DSC (differential scanning calorimeter) manufactured by Perkin Elmer, Inc. was used to conduct a measurement. The measurement was made in a nitrogen atmosphere in accordance with the temperature patterns shown in Table 1 below.

TABLE 1

| Segment | Mode | Rate (° C./min) | Temperature (° C.) |
| --- | --- | --- | --- |
| 1 | isothermal | | 20 |
| 2 | temperature rising | 10 | 20 → 210 |
| 3 | isothermal | | 210 |
| 4 | cooling | 10 | 210 → −10 |
| 5 | isothermal | | −10 |
| 6 | temperature rising | 10 | −10 → 210 |

(3) IR Analysis:

A sample which had been formed into a sheet by hot pressing was subjected to an IR examination to thereby determine the comonomer contents.

The contents were calculated by converting 1) the areal ratio of 1,740 cm$^{-1}$/(730–720) cm$^{-1}$ in the case of EtBA or 2) the areal ratio of 1,710 cm$^{-1}$/(730–720) cm$^{-1}$ in the case of EAA, using the following equation.

$$[RA]=1.3503(\text{areal ratio})-0.2208$$

3. Evaluation Methods (1) MFR:

A measurement was made at 190° C. under 2.16 kg in accordance with JIS K7210.

(2) Tensile Yield Stress:

Values were obtained through a measurement made in accordance with JIS K7162. Test pieces were cut out of a compression-molded sheet with a thickness of 4 mm produced under the conditions shown in JIS K6922-2(1997), Table 2, so as to have versatile test piece shape 1B, and subjected to the measurement in a 23° C. environment under the conditions of a pulling speed of 50 mm/min.

(3) Tensile Rupture Stress:

The values are ones measured in accordance with JIS K7162.

(4) Tensile Rupture Elongation:

The values are ones measured in accordance with JIS K7162.

4. Methods for Regulating Ligands and Catalysts:

Catalyst (A) and catalyst (B) were prepared in accordance with International Publication WO 2010/050256. Specific procedures of the preparation are explained below.

Catalyst (A): In toluene (14.5 mL) was dissolved bis(1,5-cyclooctadiene)nickel(0) (Ni(COD)$_2$; manufactured by Kanto Chemical Co., Ltd.) (40.0 mg; 145 μmol). This solution (10 mmol/mL; 10 mL) was added to 2-bis(2,6-dimethoxyphenyl)phosphanyl-6-(pentafluorophenyl)phenol (56.4 mg; 99.9 μmol), and the resultant mixture was stirred at 40° C. for 90 minutes, thereby preparing the catalyst.

Catalyst (B): In toluene (24.5 mL) was dissolved 2-bis(2,6-dimethoxyphenyl)phosphanyl-6-t-butylphenol (1.394 g; 3.07 mmol). This solution (24.0 mL; 3.00 mmol) was added to a toluene (24.0 mL) of Ni(COD)$_2$ (0.8248 g; 3.00 mmol), and the resultant mixture was stirred at 45° C. for 1 hour. The solvent was removed under reduced pressure. Thereafter, the residue obtained was dissolved in toluene (38.3 mL), thereby preparing a toluene solution of catalyst (B) (78.3 μmol/mL).

Example 1

[Process for Producing Ethylene/t-Butyl Acrylate Copolymer (EtBA) (1)]

Toluene (1,000 mL) and t-butyl acrylate (tBA) (6.0 mL; 41 mmol) were introduced into an induction stirring type autoclave having a capacity of 2 L, and the reactor were heated. At the time when the contents had heated up to about 65° C., the toluene solution of catalyst (A) (20 µmol/mL; 4.0 mL; 80 µmol) was introduced thereinto. The mixture was continuously stirred at 70° C. for 1 hour while adding ethylene thereto so as to maintain a pressure of 3.0 MPa. After completion of the stirring, the unreacted ethylene was purged to terminate the polymerization. The autoclave was opened, and the mixture was subjected to filtration and washing, thereby obtaining a copolymer in an amount of 18 g. The copolymer obtained was analyzed and, as a result, the following were found: Mw=170 k; Mw/Mn=2.0; content of tBA units, [tBA]=1.1 mol %.

[Production of Ethylene/Acrylic Acid Copolymer (EAA) (1)]

The EtBA (1) (10 g) produced above was introduced into a flask, and the atmosphere in the flask was replaced with purified CE nitrogen. Thereafter, the contents were heated with a 260° C. oil bath for 2 hours. The resultant copolymer was cooled to room temperature, swelled with boiling xylene, and then taken out of the flask. The swollen copolymer was dried, thereby obtaining an ethylene/acrylic acid copolymer (EAA) (10 g).

In the copolymer,
content of acrylic acid units: [AA]=1.1 mol % and
(−3.74×[AA]+113.5=109.4)<(melting point (Tm)=114° C.)<(−3.74×[AA]+130=125.9) held. Namely, the copolymer satisfied expression (I). The copolymer obtained was analyzed, and as a result, the following were found: Mw=170 k; Mw/Mn=2.0.

The results of the analyses of the copolymer obtained are shown in Table 2.

Example 2

[Process for Producing Copolymer EtBA (2)]

Toluene (1,000 mL) and tBA (8.0 mL; 54.9 mmol) were introduced into an induction stirring type autoclave having a capacity of 2 L, and the reactor were heated. At the time when the contents had heated up to about 65° C., the toluene solution of catalyst (B) (5.0 mL; 392 µmol) was introduced thereinto. The mixture was continuously stirred at 70° C. for 1 hour while adding ethylene thereto so as to maintain a pressure of 2.0 MPa. After completion of the stirring, the unreacted ethylene was purged to terminate the polymerization. The autoclave was opened, and the mixture was subjected to filtration and washing, thereby obtaining a copolymer in an amount of 16.4 g. The copolymer obtained was analyzed and, as a result, the following were found: Mw=97 k; Mw/Mn=1.9; [tBA]=2.5 mol %.

[Production of EAA (2)]

The EtBA (2) (10 g) produced above was introduced into a flask, and the atmosphere in the flask was replaced with purified CE nitrogen. Thereafter, the contents were heated with a 260° C. oil bath for 2 hours. The resultant copolymer was cooled to room temperature, swelled with boiling xylene, and then taken out of the flask. The swollen copolymer was dried, thereby obtaining an EAA (10 g).

In the copolymer,
[AA]=2.5 mol % and
(−3.74×[AA]+113.5=104.2)<(melting point (Tm)=108° C.)<(−3.74×[AA]+130=120.7) held. Namely, the copolymer satisfied expression (I). The copolymer obtained was analyzed and, as a result, the following were found: Mw=97 k; Mw/Mn=1.9.

The results of the analyses of the copolymer obtained are shown in Tables 2 and 3.

Comparative Example 1

PRIMACOR (registered trademark) 1321, manufactured by The Dow Chemical, which was an ethylene/acrylic acid copolymer produced by the high-pressure free-radical polymerization process, was used and evaluated as an ethylene/acrylic acid copolymer.

In this copolymer,
[AA]=2.6 mol % and
(−3.74×[AA]+113.5=103.8)>(melting point (Tm)=103° C.) held. Namely, the copolymer did not satisfy expression (I).

The results of the analyses and the evaluation results are shown in Tables 2 and 3.

TABLE 2

|  | Unit | Example 1 | Example 2 | Comparative Example 1 |
|---|---|---|---|---|
| Ethylene units | mol % | 98.9 | 97.5 | 97.4 |
| (Meth)acrylic acid units | mol % | 1.1 | 2.5 | 2.6 |
| Melting point (Tm) | ° C. | 114 | 108 | 103 |
| Value of right side of expression (I) (−3.74 × [AA] + 113.5) | — | 109.4 | 104.2 | 103.8 |
| Value of left side of expression (I) (−3.74 × [AA] + 130) | — | 125.9 | 120.7 | 120.3 |
| Expression (I) | — | satisfied | satisfied | not satisfied |
| Mw | (×10³) | 170 | 97 | — |
| Mw/Mn | — | 2.0 | 1.9 | — |

TABLE 3

|  | Unit | Example 2 | Comparative Example 1 |
|---|---|---|---|
| MFR | g/10 min | 4.1 | 3.0 |
| Tensile yield stress | MPa | 15.2 | 10.0 |
| Tensile rupture stress | MPa | 43.3 | 20.1 |
| Tensile rupture elongation | % | 1050 | 640 |

(Evaluation Results)

As shown in Tables 2 and 3, the ethylene/acrylic acid copolymers (Examples 1 and 2) produced by production processes of the invention have higher heat resistance and better mechanical strength than the ethylene/acrylic acid copolymer (Comparative Example 1) produced by the conventional free-radical polymerization process.

INDUSTRIAL APPLICABILITY

The ethylene/unsaturated carboxylic acid copolymers, in particular, ethylene/(meth)acrylic acid copolymers, obtained by the production process of the invention show satisfactory coatability, printability, antistatic properties, inorganic-filler dispersing properties, adhesiveness to other resins, compatibility with other resins, etc., these properties being attributable to the effects of the polar groups of the copolymers. The ethylene/(meth)acrylic acid copolymers of the invention can be used in various applications so as to take advantage of these properties. For example, the copolymers are suitable for use as films, sheets, adhesive resins, binders, compatibilizing agents, waxes, etc.

The invention claimed is:

1. A process for producing an ethylene/unsaturated carboxylic acid copolymer comprising a structural unit derived from ethylene and a structural unit derived from unsaturated carboxylic acid, which have been copolymerized randomly and linearly, wherein the process comprises:

producing an ethylene/unsaturated carboxylic acid ester copolymer from ethylene and unsaturated carboxylic acid ester using a late-transition-metal complex catalyst;

wherein the late-transition-metal complex catalyst is a catalyst comprising a late-transition-metal complex represented by the following formula (A):

(A)

in which
M is nickel;
$R^1$ is a hydrogen atom or a hydrocarbon group which has 1-20 carbon atoms and optionally contains a heteroatom;
$L^1$ is a ligand which has coordinated to the M;
$R^1$ and $L^1$ are optionally bonded to each other to form a ring;
P is phosphorus;
O is oxygen;
$R^2$ and $R^3$ each independently represents a hydrocarbon group which has 1-30 carbon atoms and optionally contains a heteroatom, and $R^2$ and $R^3$ are optionally bonded to each other to form a ring;
$R^4$ to $R^7$ each independently represents a hydrogen atom, a halogen atom, a hydrocarbon group which has 1-30 carbon atoms and optionally contains a heteroatom, OR, $CO_2R_8$, $CO_2M^1$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $PO_3M''$, $P(O)(OR^8)_2K$, or an epoxy-containing group, where
$R^8$ represents a hydrocarbon group having 1-20 carbon atoms,
$R^9$ represents a hydrogen atom or a hydrocarbon group having 1-20 carbon atoms,
M' represents an alkali metal, ammonium, quaternary ammonium, or phosphonium,
M" represents an alkaline earth metal,
x represents an integer of 0-3, and
y represents an integer of 0-2; and
heating the ethylene/unsaturated carboxylic acid ester copolymer at 190-270° C., thereby converting into the ethylene/unsaturated carboxylic acid copolymer.

2. The process for producing an ethylene/unsaturated carboxylic acid copolymer according to claim 1, wherein the unsaturated carboxylic acid ester is (meth)acrylic acid ester and the unsaturated carboxylic acid is (meth)acrylic acid.

3. The process for producing an ethylene/unsaturated carboxylic acid copolymer according to claim 1, wherein the late-complex is a phosphine-phenolate complex.

4. The process for producing an ethylene/unsaturated carboxylic acid copolymer according to claim 1, wherein the unsaturated carboxylic acid ester is (meth)acrylic acid ester and the alcohol moiety of the (meth)acrylic acid ester is a tertiary alcohol.

* * * * *